(12) United States Patent
Stevens

(10) Patent No.: US 8,368,959 B2
(45) Date of Patent: Feb. 5, 2013

(54) METHOD AND SYSTEM FOR SELECTIVE SMOOTHING OF HALFTONED OBJECTS USING BITMAP ENCODING

(75) Inventor: Michael Dale Stevens, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 873 days.

(21) Appl. No.: 12/467,441

(22) Filed: May 18, 2009

(65) Prior Publication Data

US 2010/0290089 A1 Nov. 18, 2010

(51) Int. Cl.
*G06K 15/00* (2006.01)
*G06K 9/34* (2006.01)
(52) U.S. Cl. ..................... 358/3.06; 382/173
(58) Field of Classification Search ............... 358/3.06
See application file for complete search history.

(56) References Cited

U.S. PATENT DOCUMENTS

| | | | |
|---|---|---|---|
| 4,194,221 A | 3/1980 | Stoffel | |
| 4,811,115 A | 3/1989 | Lin et al. | |
| 4,941,190 A | 7/1990 | Joyce | |
| 5,131,049 A | 7/1992 | Bloomberg et al. | |
| 5,216,753 A | 6/1993 | Ng | |
| 5,303,334 A | 4/1994 | Snyder et al. | |
| 5,307,180 A | 4/1994 | Williams et al. | |
| 5,327,262 A | 7/1994 | Williams | |
| 5,404,411 A | 4/1995 | Banton et al. | |
| 5,434,953 A | 7/1995 | Bloomberg | |
| 5,526,438 A | 6/1996 | Barton | |
| 5,604,605 A | 2/1997 | Moolenaar | |
| 5,701,364 A | 12/1997 | Kanno | |
| 5,765,029 A | 6/1998 | Schweid et al. | |
| 5,778,156 A | 7/1998 | Schweid et al. | |
| 5,784,049 A | 7/1998 | Hall | |
| 5,850,474 A | 12/1998 | Fan et al. | |

(Continued)

FOREIGN PATENT DOCUMENTS

| | | |
|---|---|---|
| EP | 0683599 | 11/1995 |
| EP | 1107577 | 6/2001 |

(Continued)

OTHER PUBLICATIONS

An Unofficial Prosecution History Between Oct. 18, 2011 and Jan. 30, 2012 for U.S. Appl. No. 11/694,378, filed Mar. 30, 2007, Published Oct. 2, 2008, AS US-2008-0239401-A1; Inventor: Michael Dale Stevens.

(Continued)

*Primary Examiner* — Saeid Ebrahimi Dehkordy
(74) *Attorney, Agent, or Firm* — Michael J. Nickerson; Basch & Nickerson LLP

(57) ABSTRACT

An image processing system utilizes an image type classification circuit to identify inputted image data as picture image data or text/graphics image data. A halftone circuit, operatively connected to the image type classification circuit, converts the inputted image data, identified as picture image data, to halftone image data. Moreover, a tile pattern circuit, operatively connected to the image type classification circuit, to replace the inputted image data, identified as text/graphics image data, with tile patterns. Non-halftone cluster areas in the tile patterns are encoded with a predetermined pattern. A bitmap rendering circuit combines the halftone image data with the encoded tile patterns to render a bitmap, wherein the bitmap can be used by a print engine to reproduce the image.

18 Claims, 24 Drawing Sheets

U.S. PATENT DOCUMENTS

| | | | |
|---|---|---|---|
| 5,852,678 | A | 12/1998 | Shiau et al. |
| 5,930,396 | A | 7/1999 | Fiala et al. |
| 5,949,964 | A | 9/1999 | Clouthier et al. |
| 5,960,106 | A | 9/1999 | Tsuchiya et al. |
| 6,020,978 | A | 2/2000 | Cooper et al. |
| 6,144,489 | A | 11/2000 | Wilson et al. |
| 6,157,736 | A * | 12/2000 | Jodoin et al. .................. 382/173 |
| 6,181,829 | B1 | 1/2001 | Clark et al. |
| 6,185,328 | B1 | 2/2001 | Shiau |
| 6,229,923 | B1 | 5/2001 | Williams et al. |
| 6,240,205 | B1 | 5/2001 | Fan et al. |
| 6,347,153 | B1 | 2/2002 | Triplett et al. |
| 6,382,757 | B1 | 5/2002 | Kakutani |
| 6,549,658 | B1 | 4/2003 | Schweid et al. |
| 6,760,126 | B1 | 7/2004 | Kritayakirana et al. |
| 6,983,076 | B2 | 1/2006 | Curry et al. |
| 7,079,281 | B1 | 7/2006 | Ng et al. |
| 7,079,287 | B1 | 7/2006 | Ng et al. |
| 7,239,430 | B2 | 7/2007 | Shiau et al. |
| 7,609,411 | B2 * | 10/2009 | Silverbrook et al. ......... 358/1.6 |
| 7,706,021 | B2 | 4/2010 | Kaburagi |
| 2001/0045957 | A1 | 11/2001 | Ulichney |
| 2003/0058250 | A1 | 3/2003 | Adams et al. |
| 2004/0114185 | A1 | 6/2004 | Shiau et al. |
| 2005/0052468 | A1 | 3/2005 | Kroon |
| 2008/0239401 | A1 | 10/2008 | Stevens |

FOREIGN PATENT DOCUMENTS

| | | |
|---|---|---|
| WO | WO9933257 | 7/1999 |

OTHER PUBLICATIONS

U.S. Appl. No. 11/694,378—an unofficial prosecution history between Nov. 22, 2010 and Apr. 25, 2011 for U.S. Appl. No. 11/694,378, filed Mar. 30, 2007 (published Oct. 2, 2008 as US-2008-0239401-A1); inventor Michael Dale Stevens.

7,239,430—an unofficial prosecution history of US patent 7,239,430 issued Jul. 3, 2007 (U.S. Appl. No. 10/318,614, filed Dec. 12, 2002, published Jun. 17, 2004 as US 2004-0114185 A1; Inventors Shiau et al.

An unofficial file history, as of May 18, 2009 for U.S. Appl. No. 11/694,378.

U.S. Appl. No. 11/694,378—An Unofficial Prosecution History Between Apr. 26, 2011 and Oct. 17, 2011 for U.S. Appl. No. 11/694,378, filed Mar. 30, 2007, Published Oct. 2, 2008, AS US-2008-0239401-A1; Inventor: Michael Dale Stevens.

An unofficial prosecution history as of Nov. 22, 2010 for U.S. Appl. No. 11/694,378.

An unofficial prosecution history as of Nov. 22, 2010 for U.S. Appl. No. 10/655,719.

Maxfield, C.; Hug an XOR gate today: an introduction to Reed-Muller logic; Mar. 1, 1996; 6 pages; EDN Access for design-by design; 6 Webpages—EDN Magazine.

An Unofficial Prosecution History Between Jan. 31, 2012 and Apr. 24, 2012 for U.S. Appl. No. 11/694,378, filed Mar. 30, 2007, Published Oct. 2, 2008, AS US-2008-0239401-A1; Inventor: Michael Dale Stevens.

* cited by examiner

FIG. 5

| A2 L2 | A2 L1 | A2 C | A2 R1 | A2 R2 |
|---|---|---|---|---|
| A1 L2 | A1 L1 | A1 C | A1 R1 | A1 R2 |
| C L2 | C L1 | C | C R1 | C R2 |
| B1 L2 | B1 L1 | B1 C | B1 R1 | B1 R2 |
| B2 L2 | B2 L2 | B2 C | B2 R1 | B2 R2 |

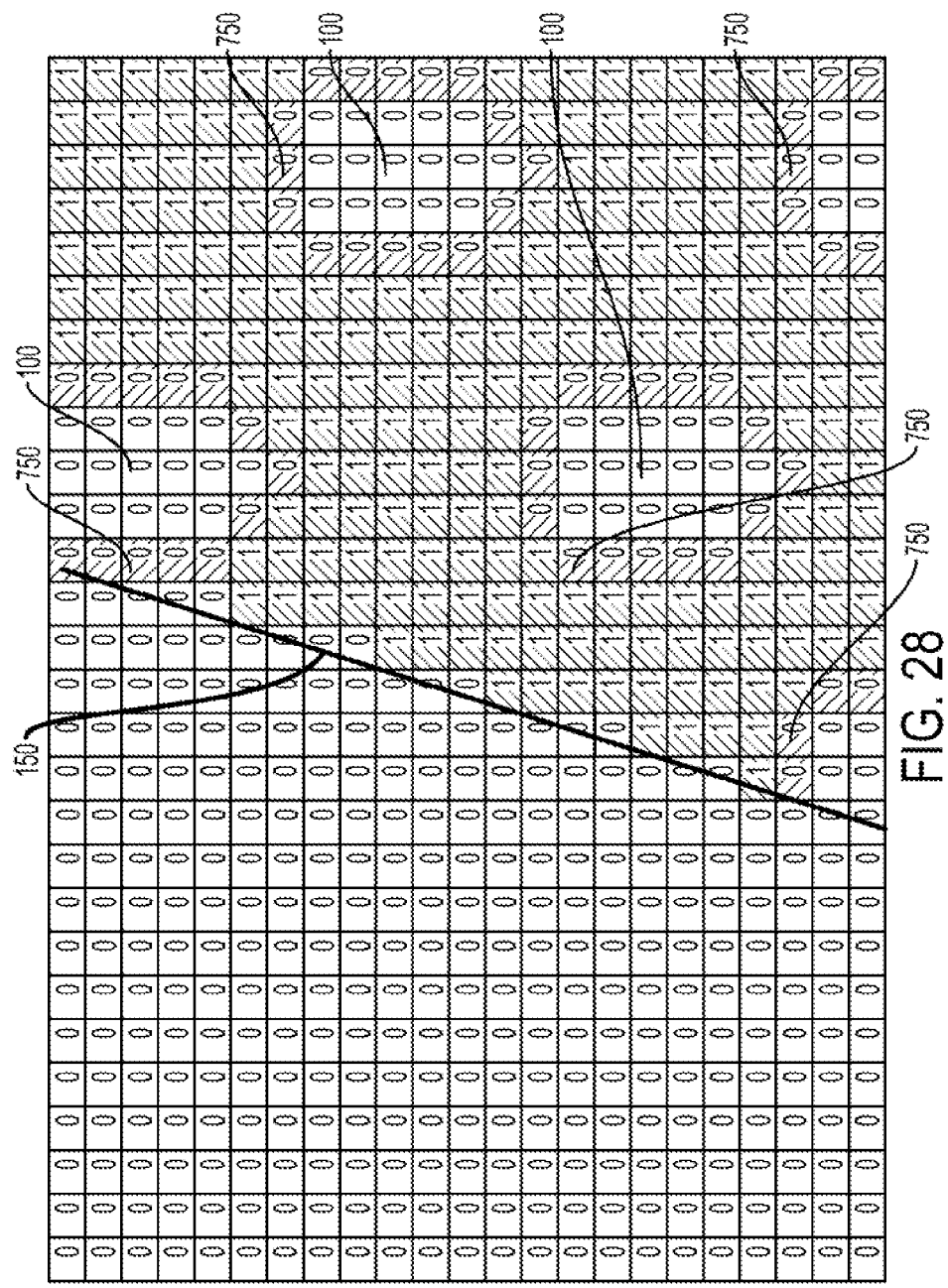

METHOD AND SYSTEM FOR SELECTIVE SMOOTHING OF HALFTONED OBJECTS USING BITMAP ENCODING

BACKGROUND AND SUMMARY

Digital multifunction reprographic systems are well known and have replaced optical reprographic systems as a way to reproduce images. In these conventional digital multifunction reprographic systems, a scanner accepts a document to be copied and converts the document into electronic image(s). These images, usually in the form of pages, are then passed to a central control unit that may re-order or reorganize these pages and then, depending on the request of the user of the device, send the pages or images to a destination. Often this destination is an attached printing unit that makes one or more copies of the original document.

However, these conventional devices perform many other functions besides simple copying. The central control unit is usually equipped with a combination of hardware and software elements that enable it to accept input from other sources. The other sources may include some sort of network interface and/or an interface to a telephone system to enable FAX input.

The network interface is usually configured so that it can accept jobs to be printed from any computer source that is connected to the network. This configuration normally includes elements that can convert input documents formatted in one or more page description languages (PDLs) to the native format of the printing device.

An important inner component of such a conventional multifunction digital device is the image path. This combination of software and hardware elements accepts the electronic images from a multiplicity of sources and performs any operations needed to convert the images to the format desired for the various output paths. The image path is usually one of the more complex and costly components of such digital multifunction devices.

In some conventional systems, the image path has two parallel paths or methods for rendering binary data into a frame buffer memory. In these conventional systems, image data, which has been identified or classified as picture image data, is rendered in raster sequence, while image data, which has been identified or classified as text image data and graphics image data, is rendered from pre-built tile patterns. The binary tile patterns are created using halftone threshold arrays and are copied into the frame buffer memory inside each object or text boundary to create the appropriate text or graphics image in the frame buffer memory.

The conventional systems, which implement the image path having two parallel paths or methods for rendering binary data into a frame buffer memory, create a bitmap in the frame buffer memory consisting of binary tile patterns combined with the halftoned raster data from picture image data and non-halftoned data. However, the conventional two-path implementation produces text and graphics objects with jagged and poorly formed edges due to the halftoning from clustered dot screens. Moreover, after rendering into a binary format, these conventional systems fail to bridge the gaps between the clusters, thereby failing to smooth the edges of text and graphics.

More specifically, jagged edges, and poorly formed shapes occur because the pixel clusters in the halftone screens only paint spots at a particular frequency and angle. Edges and areas in between the clusters are left blank.

Although higher halftone frequencies with a smaller distance in between the clusters make smoother edges, most conventional laser printers do not print well with the higher frequency screens. On the other hand, with respect to many conventional print engines, the shades are more stable, and appear smoother when the frequencies are between one hundred to one hundred fifty lines per inch.

Thus, a low frequency screen provides for smoother shades but jagged edges, while a higher frequency screen provides for smooth edges but less stable shades.

In one conventional system, a bit binary halftone tile pattern is encoded with a constant high frequency checkerboard pattern, wherein the checkerboard pattern consists of alternating pixels, ON and OFF in both x and y directions. The conventional system uses an exclusive-OR operation to produce an encoded tile pattern. During bitmap processing, the high frequency patterns in the bitmap frame memory (or band buffers) are detected and decoded. The original halftone pattern is restored using the same X-OR operation and the same high frequency checkerboard pattern.

Such a conventional system is disclosed in co-pending U.S. patent application Ser. No. 11/694,378, filed on Mar. 30, 2007, entitled "Method and System for Selective Bitmap Edge Smoothing." The entire content of co-pending U.S. patent application Ser. No. 11/694,378, filed on Mar. 30, 2007, is hereby incorporated by reference.

Therefore, it is desirable to provide an image path with two parallel paths or methods for rendering binary data into a frame buffer memory that produces text and graphics objects without jagged or poorly formed edges.

Also, it is desirable to implement an image path having two parallel paths or methods for rendering binary data into a frame buffer memory that bridges the gaps between the clusters, thereby smoothing the edges of text and graphics.

Furthermore, it is desirable to implement an image path having two parallel paths or methods for rendering binary data into a frame buffer memory that avoids damaging the more complex picture objects when the same halftone patterns are used for both image paths.

Moreover, it is desirable to implement an edge smoothing process during rendering that improves the shape and appearance of halftoned objects and halftoned text with the lower frequency screens.

Lastly, it is desirable to implement an image path having two parallel paths or methods for rendering binary data into a frame buffer memory that avoids adding error to the actual edge positions during decoding.

BRIEF DESCRIPTION OF THE DRAWING

The drawings are only for purposes of illustrating various embodiments and are not to be construed as limiting, wherein:

FIG. 5 shows an example of halftone clusters;

FIG. 9 illustrates an example of a window for decoding the encoded pixels to restore the original image pattern;

FIG. 10 illustrates an example of a rule wherein the adjacent encoded pixels are OFF;

FIG. 11 illustrates an example of a rule wherein three of four corner encoded pixels are ON;

FIG. 12 illustrates an example of a rule wherein any of four pixels, two pixels from center in horizontal or vertical direction are ON;

FIG. 13 illustrate an example of a rule wherein if one or more pixels form a 45 degree line segment through the center, and the pixels in the extreme corners of the window are ON, and either of two pixels touching the extreme corners of the window are ON, and the pixel in between these and the center is OFF;

FIG. 16 illustrates an example of detecting edges;

FIG. 28 illustrates shows an example of a decode mask wherein the encoding was applied to the non-halftone cluster areas and a one pixel gap around the halftone clusters.

DETAILED DESCRIPTION

Figure 1:
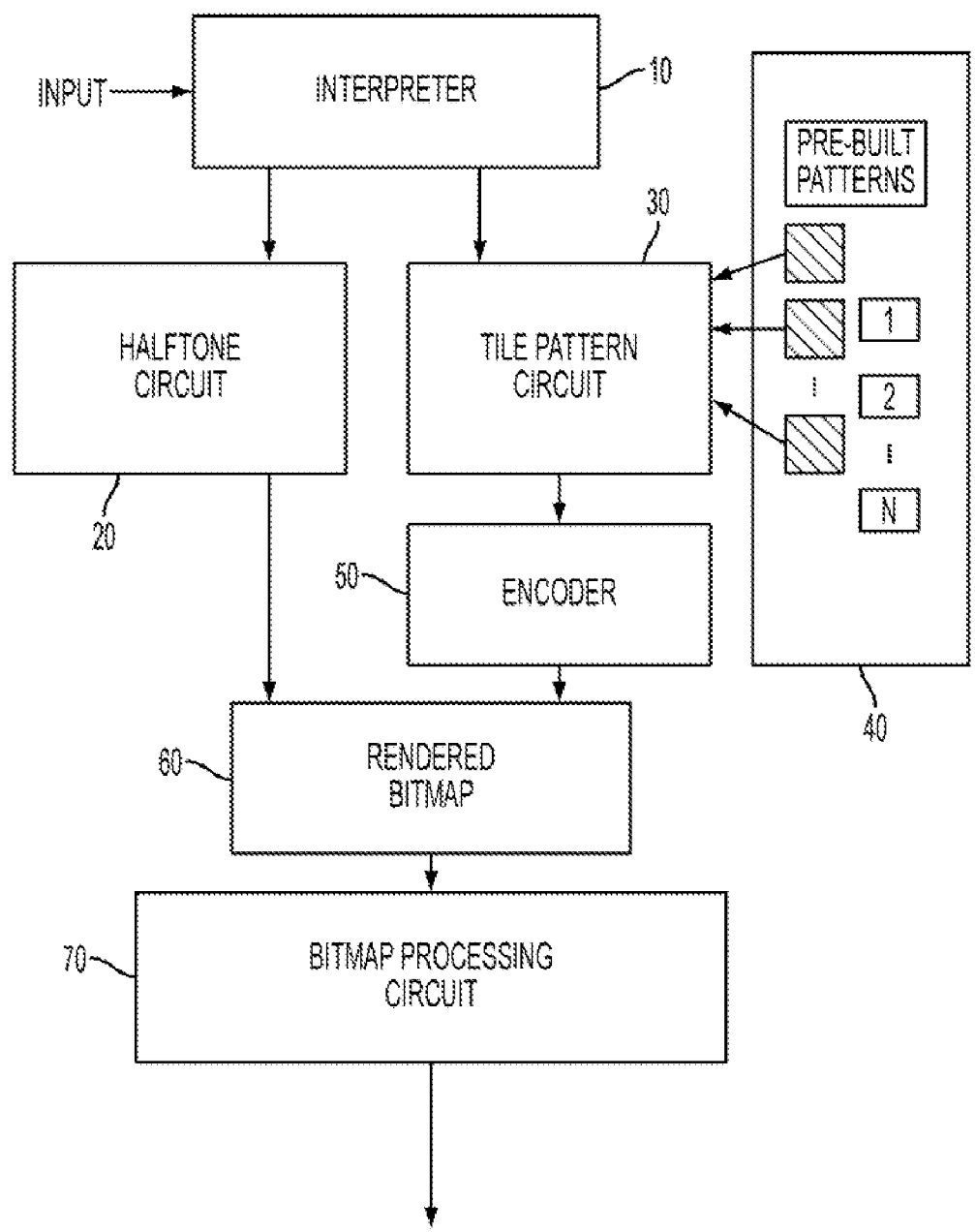
FIG. 1 shows an image path having two parallel paths for rendering binary data into a frame buffer memory wherein the binary tile patterns are encoded.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 shows, in schematic form, an image path of a reprographic system. The image path is a combination of hardware and software elements that generate and process the digital images.

As illustrated in FIG. 1, digital image data is input into an interpreter 10 that analyzes the image data to determine if the image data is picture image data or text/graphics image data. The interpreter 10 utilizes conventional image classification routines/circuitry or image segmentation routines/circuitry. An example of a conventional image classification routine/circuit is described in U.S. Pat. No. 5,765,029. The entire content of U.S. Pat. No. 5,765,029 is hereby incorporated by reference.

Based upon the classification determined by the interpreter 10, picture image data is sent to a halftone circuit 20 and text/graphics image data is sent to a tile pattern circuit 30. The halftone circuit 20 converts the picture image data into the appropriate halftone image data, while the tile pattern circuit 30 replaces the text/graphics image data with the appropriate binary halftone tile pattern. An example of binary halftone tile pattern circuit is described in Published US Patent Application, Publication Number 2005/00524468. The entire content of Published US Patent Application, Publication Number 2005/00524468, is hereby incorporated by reference.

After converting the text/graphics image data to a binary halftone tile pattern, the binary halftone tile pattern is encoded with a pattern by encoder 50. More specifically, the encoder 50 encodes each tile by adding a high frequency checkerboard pattern in between clusters. An example of a pattern for encoding is a high frequency checkerboard pattern as illustrated in FIG. 2.

Figure 2:
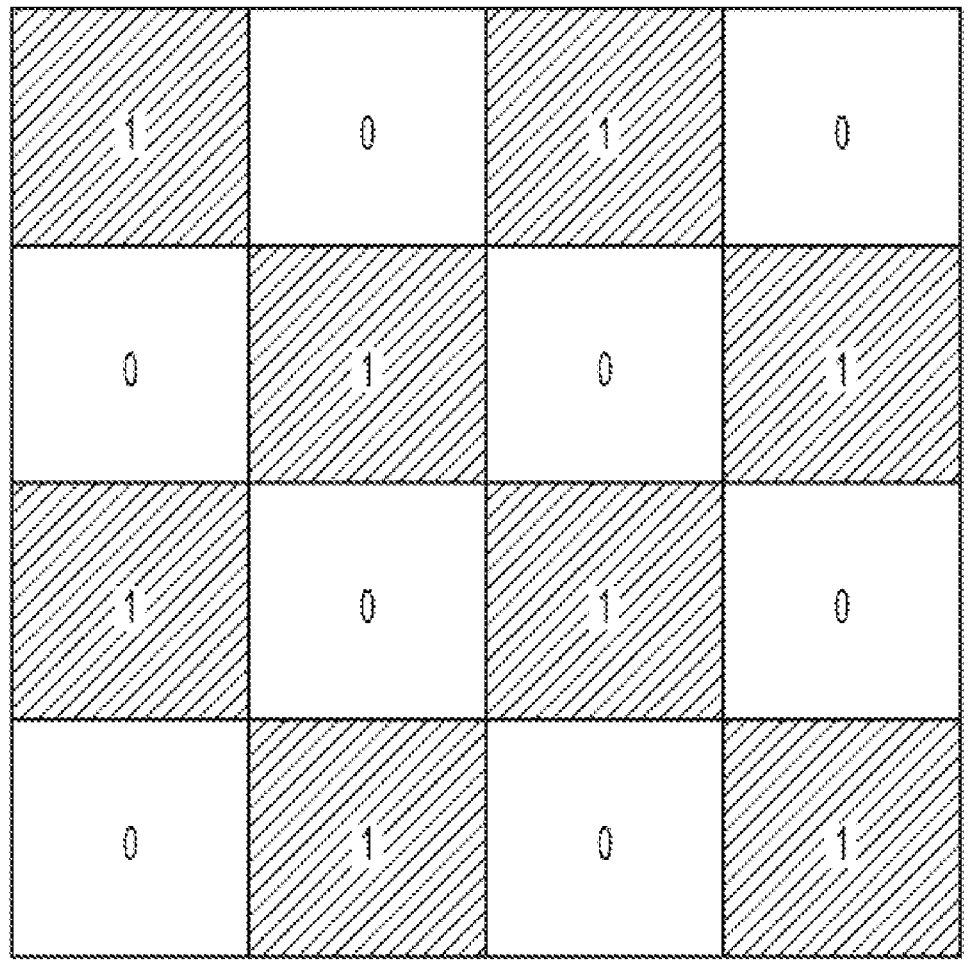
FIG. 2 shows an example of a high frequency checkerboard pattern used in encoding the binary tile patterns.

It is noted that the tile patterns can be pre-encoded with a high frequency checkerboard pattern as illustrated in FIG. 2. In the situation where the tile patterns are pre-encoded with a high frequency checkerboard pattern, the encoder 50 would not be necessary.

It is further noted that encoder 50 could be an optional encoding. More specifically, the encoder 50 can be invoked in response to a user selected feature or image classification, or the encoder 50 can merely pass the tile pattern through without encoding in response to a user selected feature or image classification.

The halftone image data from the halftone circuit 20 is combined with encoded tile patterns from the encoder 50 to render a bitmap that is stored in a frame buffer memory 60. The bitmap is subsequently processed by the bitmap processing circuit 70. The bitmap processing circuit 70 may carry out functions such as filtering, thickening of thin lines, edge enhancement, etc.

With respect to edge enhancement, the bitmap processing circuit 70 may find edge pixel candidates from decode mask, filter out unwanted edge candidates, and adjust edge darkness by adding pixels and regrouping. These processes will be descried in more detail below. The edge-processed data is ready to be sent to the printer.

As noted above, the system has two methods for rendering binary data into frame buffer memory. Pictures are rendered in raster sequence, while text and graphics are rendered from pre-built tile patterns. The binary tile patterns are rendered using halftone threshold arrays and are normally copied into the frame buffer inside each object or text boundary. The pre-built binary halftone tiles are encoded with a high frequency checkerboard pattern, so the bitmap in the frame buffer memory will consist of these patterns combined with the halftoned raster data from pictures and non-halftoned data The high frequency checkerboard pattern of the encoded data reveals the true shape and edges of the halftoned objects. The encoded pattern is filtered and decoded in the frame memory to restore original halftone pattern before being sent to the print engine.

Since the edges are identified while decoding, the edges are made smoother. The pictures and other objects are not affected.

By utilizing the encoded tile patterns, the jagged edges of halftoned objects are smoothed and the intended shapes of fonts, objects, and fine lines are preserved.

FIGS. 17-21 will be used in describing examples of preserving the intended shape of each object along with the halftone patterns wherein the encoding is applied to both the halftone clusters and the non-halftone clusters.

Figure 17:
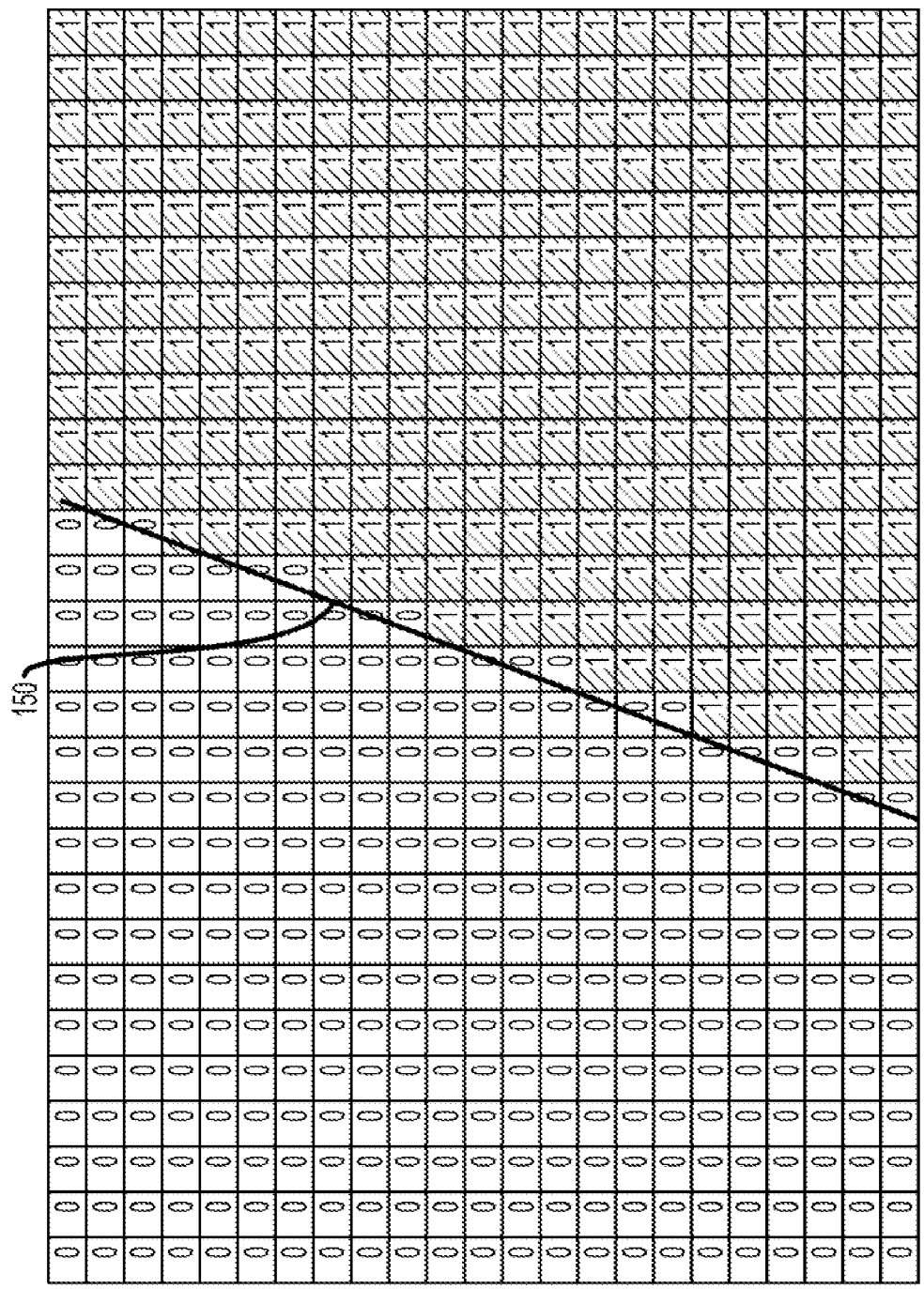
FIG. 17 shows an example of an object's edge at printer device resolution.
Figure 18:
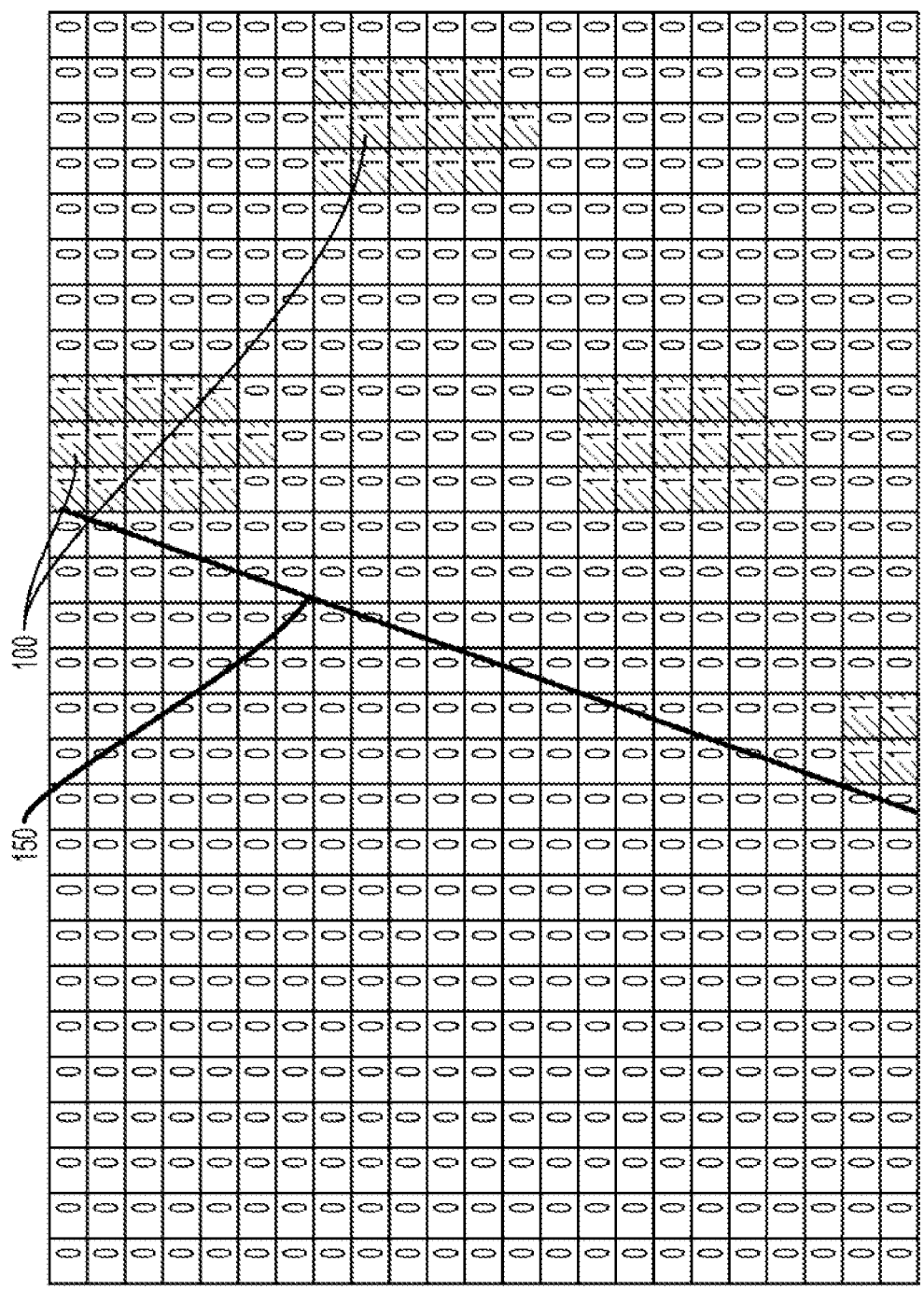
FIG. 18 shows an example of a halftoned object's edge at printer device resolution.
Figure 19:
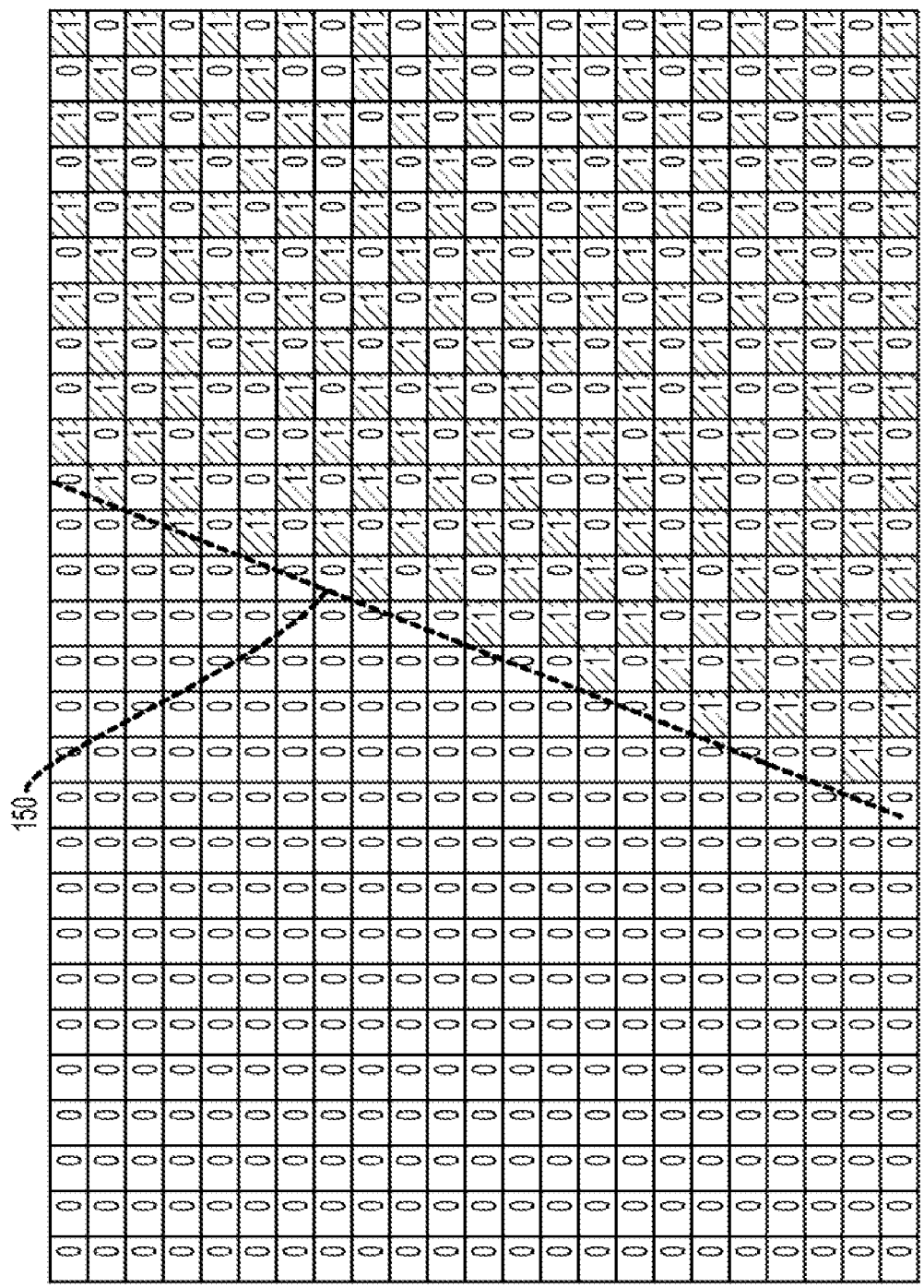
FIG. 19 shows an example of an encoded halftoned object's edge at printer device resolution wherein the encoding is applied to both the halftone clusters and the non-halftone cluster areas.

FIG. 17 illustrates an edge 150 being represented by an object's edge at a printer device resolution. On the other hand, FIG. 18 illustrates the edge 150 of FIG. 17 as being represented by a halftoned object's edge at a printer device resolution. Furthermore, FIG. 19 illustrates the edge of FIG. 17 as being represented by an encoded halftoned object's edge at a printer device resolution.

Figure 20:
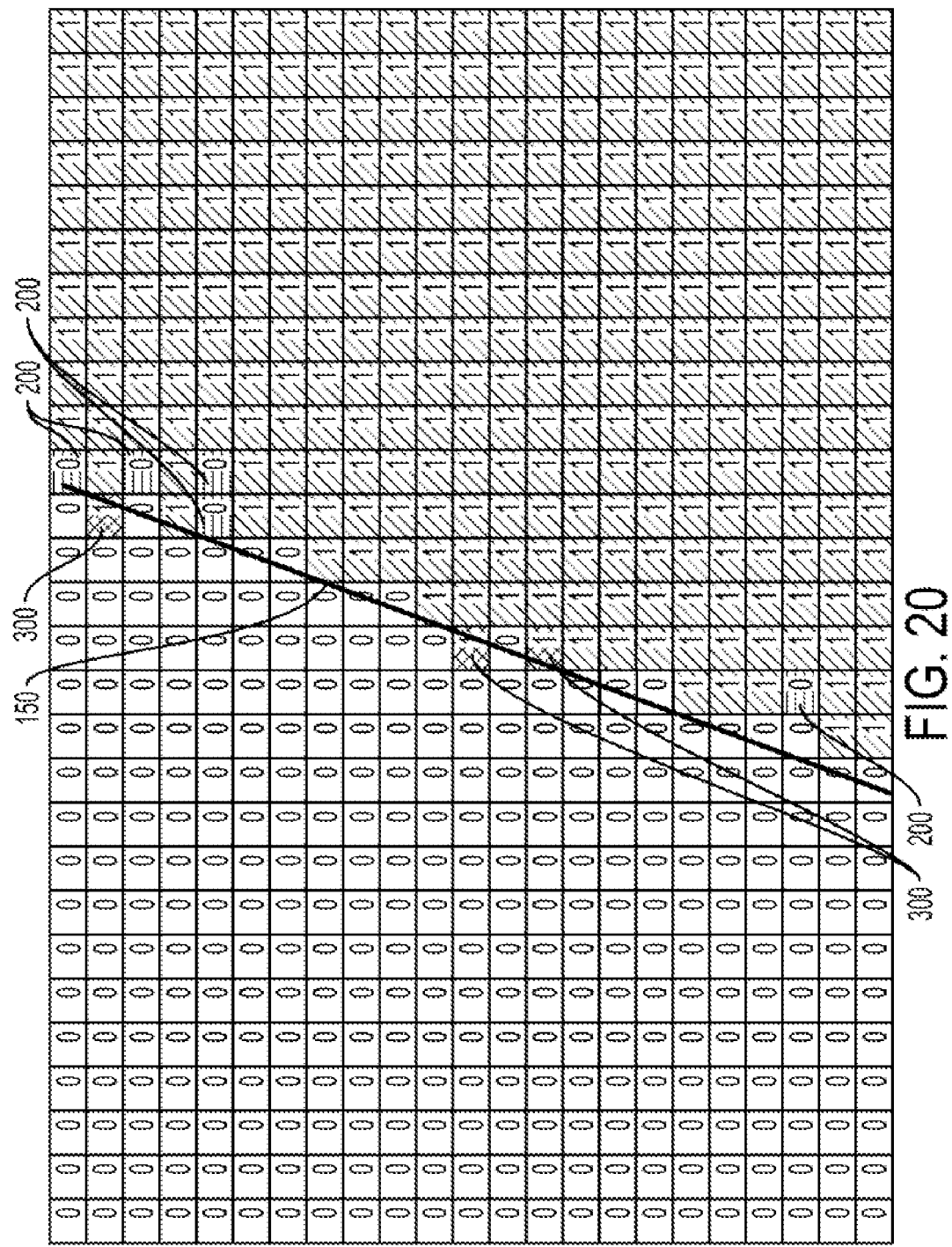
FIG. 20 shows an example of a decode mask wherein the encoding was applied to both the halftone clusters and the non-halftone cluster areas.

As noted above, a decode mask is derived from the encoded halftoned pattern. FIG. 20 illustrates a decode mask with respect to the edge 150 of an object as illustrated in FIG. 17. The decode mask is created from the object representation of FIG. 19 using the logic rules described herein. As illustrated in FIG. 20, the decode mask without errors is represented by gray cells with the number 1. FIG. 20 also illustrates extra ON pixels 300 in the decode mask, represented by dashed medium grey-shaded cells with the number 1, and missing ON pixels 200 from the decode mask, represented by shaded cells with the number 0.

Figure 21:
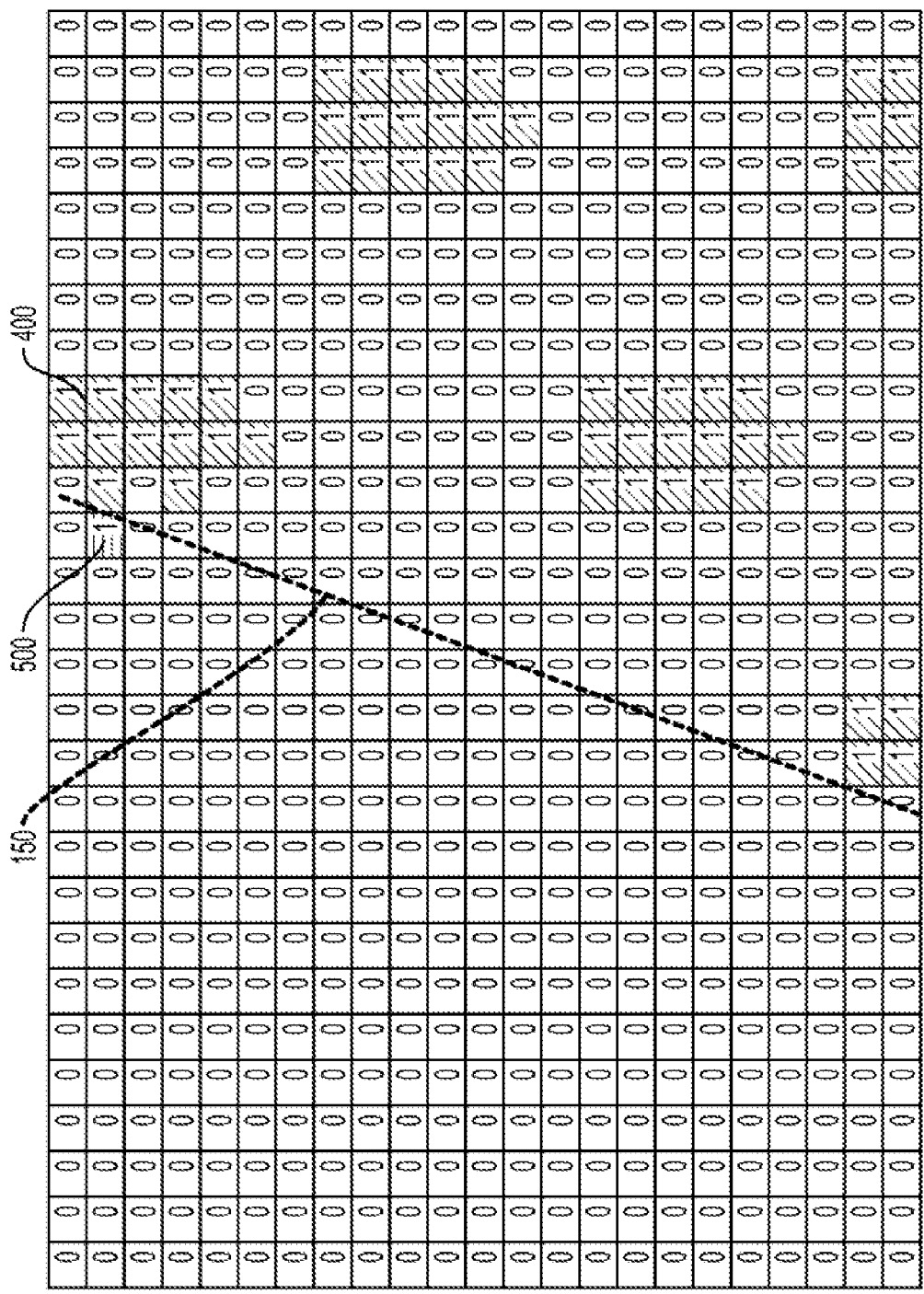
FIG. 21 shows an example of a decoded object wherein the encoding was applied to both the halftone clusters and the non-halftone cluster areas.

FIG. 21 illustrates the decoded object. The decoded object of FIG. 21 is realized by applying an exclusive-OR to binary input and the high frequency checkerboard pattern of FIG. 2 inside the decode mask area of FIG. 20. As illustrated in FIG. 21, the dark gray-shaded cells with the number 1 represent restored halftone pixels 400. FIG. 21 also illustrates a lightly gray-shaded cell with the number 1, which represent an extra pixel 500 from decode errors on object edges.

Figure 22:
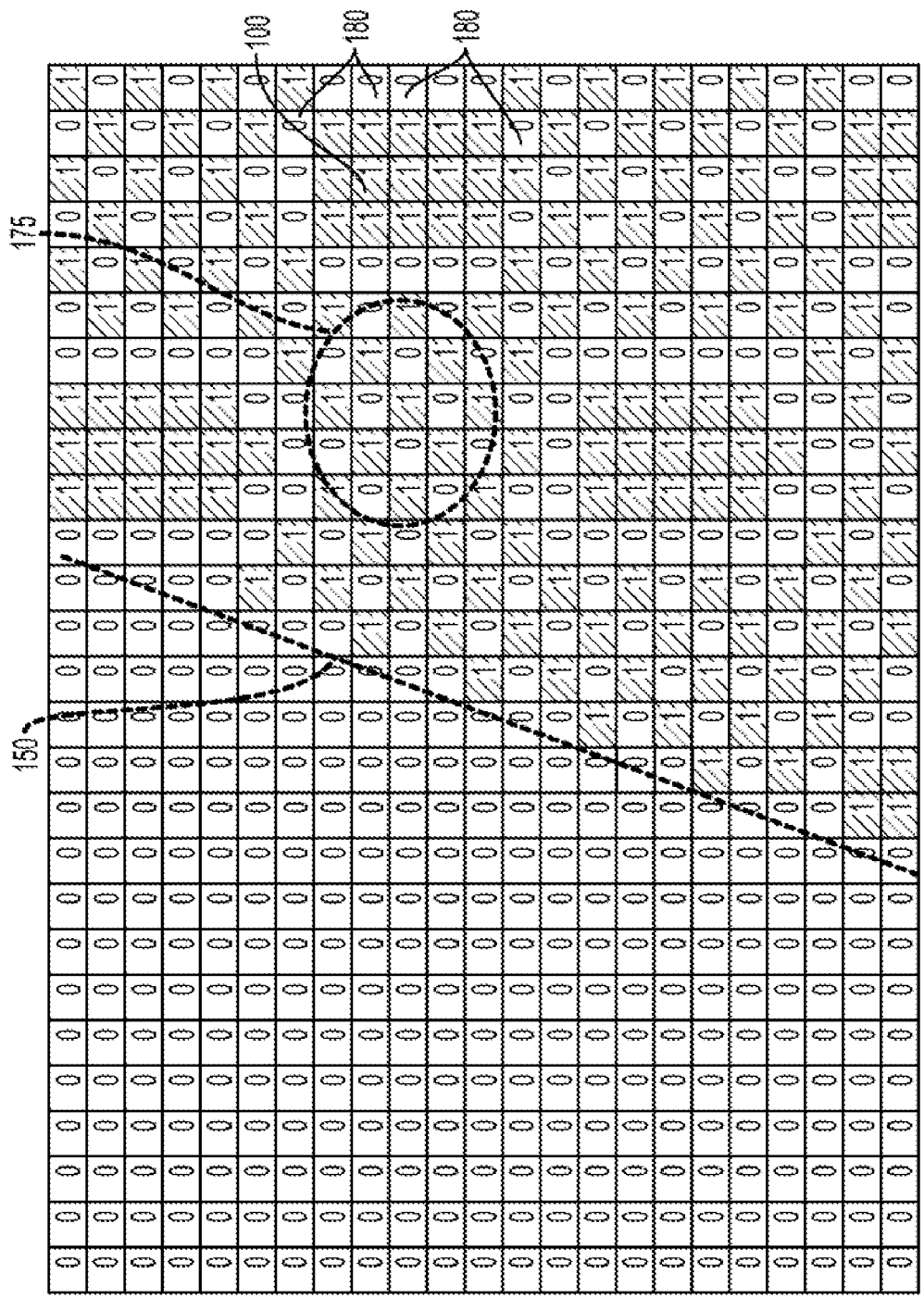
FIG. 22 shows an example of an encoded halftoned object's edge at printer device resolution wherein the encoding is applied to the non-halftone cluster areas.
Figure 23:
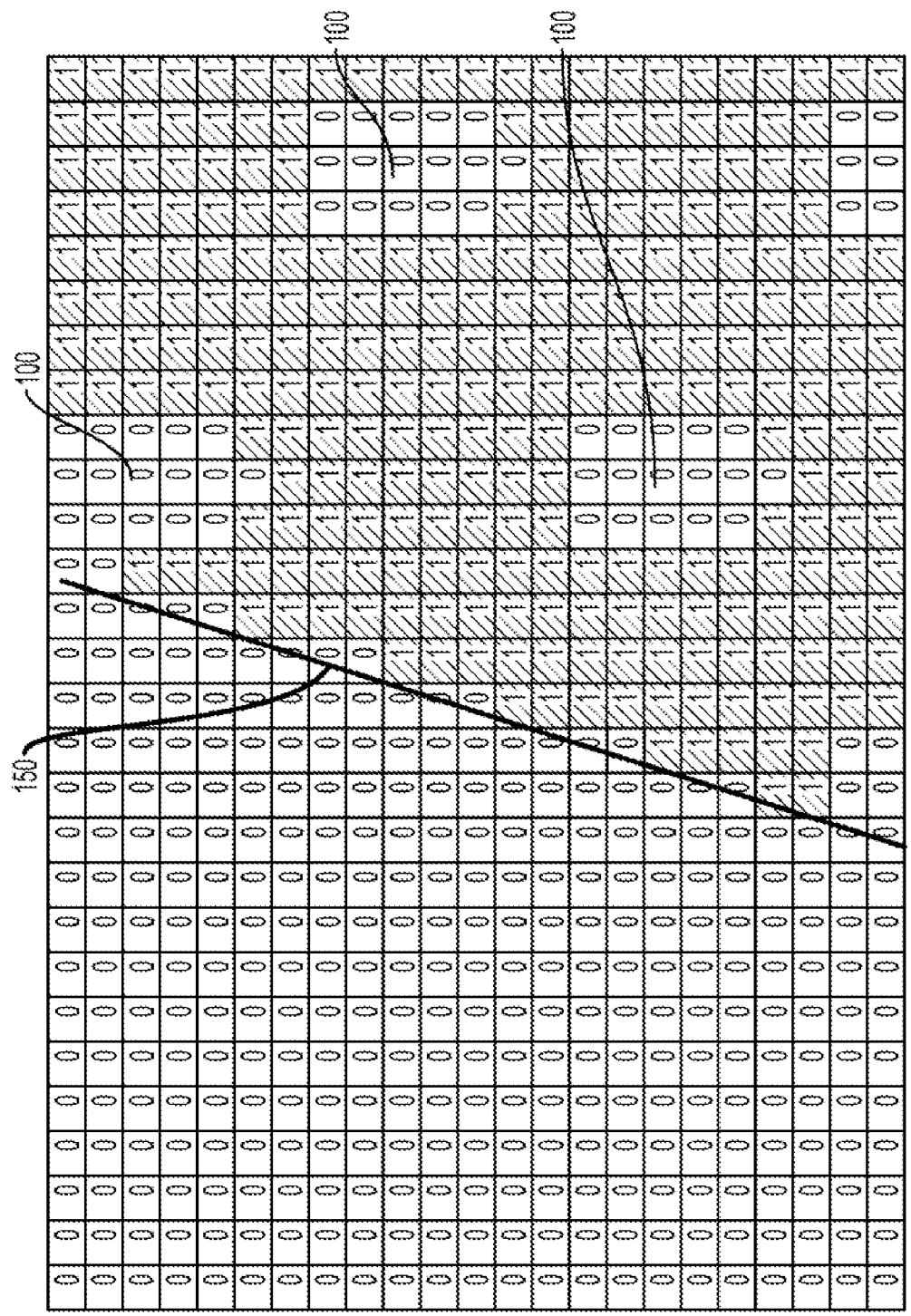
FIG. 23 shows an example of a decode mask wherein the encoding was applied to the non-halftone cluster areas.
Figure 24:
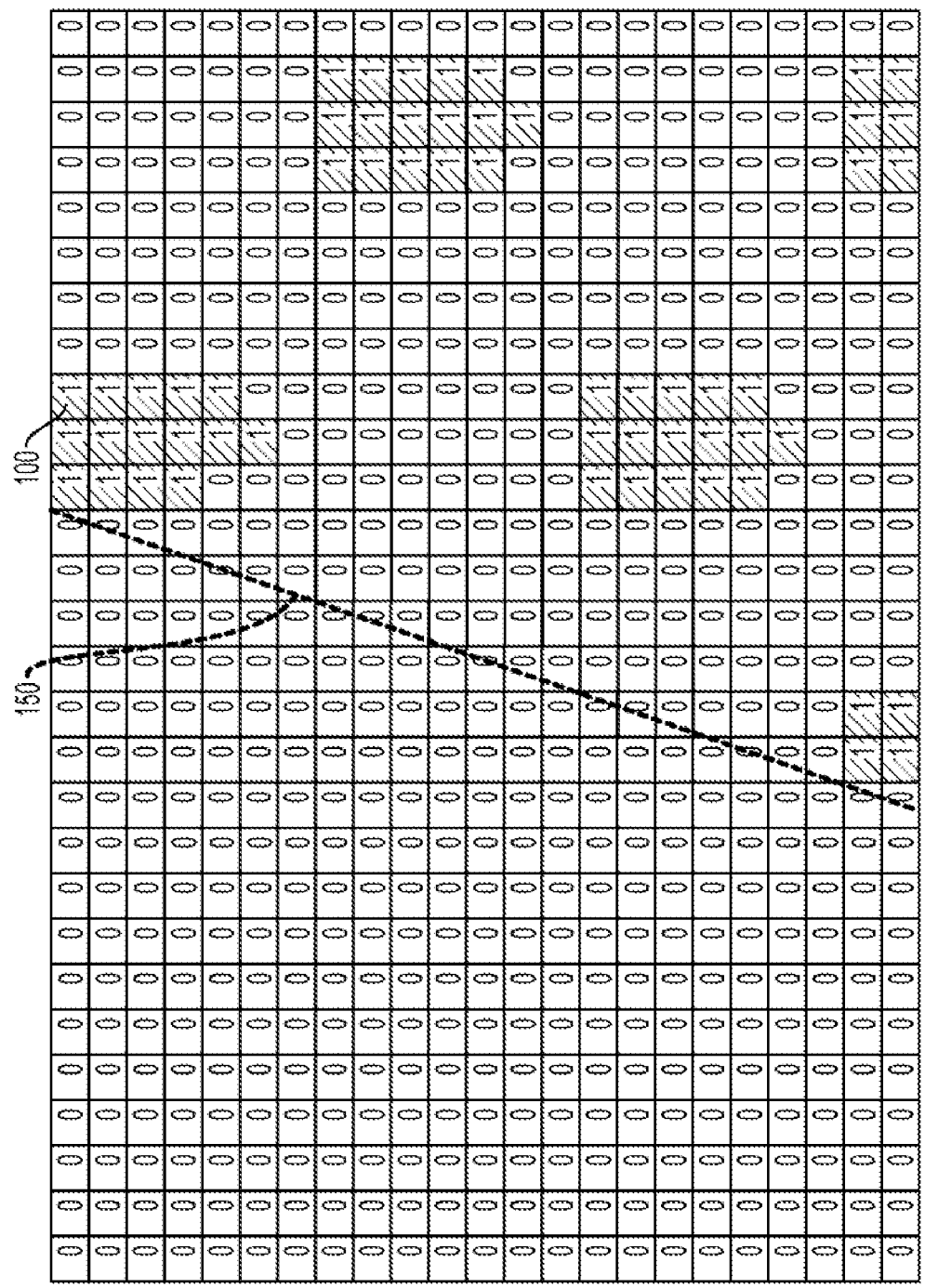
FIG. 24 shows an example of a decoded object wherein the encoding was applied to the non-halftone cluster areas.

FIGS. 22-24 will be used in describing examples of preserving the intended shape of each object along with the halftone patterns wherein the encoding is applied to the non-halftone clusters areas.

FIG. 22 illustrates the edge of FIG. 17 as being represented by an encoded halftoned object's edge at a printer device resolution wherein the encoding is applied to the non-halftone clusters areas. As illustrated in FIG. 22, an edge 150 is located between a halftoned area and a non-halftoned area wherein the non-halftoned area in FIG. 22 is the area of all zeros to the left the edge 150 and the halftoned area in FIG. 22 is the area to the right of the edge 150. Within the halftoned area in FIG. 22, an example of a halftone cluster 100 is located. FIG. 22 also illustrates an example of an encoded non-halftone cluster area 175. Moreover, FIG. 22 illustrates examples of non-encoded pixels 180 located adjacent to the halftone cluster 100.

As noted above, a decode mask is derived from the encoded halftoned pattern. FIG. 23 illustrates a decode mask with respect to the edge 150 of an object and halftone clusters 100, as illustrated in FIG. 17. The decode mask is created from the object representation of FIG. 22 using the logic rules described herein. As illustrated in FIG. 23, the decode mask is represented by gray cells with the number 1.

FIG. 24 illustrates the decoded object. The decoded object of FIG. 24 is realized by applying an logical AND to binary input and the high frequency checkerboard pattern of FIG. 2 inside the decode mask area of FIG. 23. As illustrated in FIG. 24, the shaded cells with the number 1 represent restored halftone (cluster) pixels 100.

As discussed above, two paths are used for rendering binary data into frame buffer memory (FIG. 1). Pictures are rendered in raster sequence, while text and graphics are rendered from the application of pre-built tile patterns. The binary tile patterns are first created using halftone threshold arrays. The tile patterns are used to fill inside the boundary of text or graphics objects.

The adding an encoding to the tile bit patterns is realized by adding a high frequency checkerboard pattern in the white areas that are located between halftone clusters. After rendering a page, the bitmap in the frame buffer memory will consist of a combination of these encoded halftone patterns, un-encoded halftone patterns from pictures, along with fully saturated text and graphics objects for each of the primary colors.

It is noted that text and objects made of only clustered halftone patterns have an irregular or jagged outline. The added high frequency pattern of the encoded pattern makes the edge outline smoother, and reveals the true shape of the objects.

After rendering to frame memory, the encoded pattern is decoded and the high frequency checkerboard pattern is removed, so the original halftone pattern is restored before being sent to the print engine. The edges are identified from the detected encoded pixels and the encoded input bitmap. With the edge information, the output bitmap is modified to fill in the gaps in between clusters and smooth the edges.

The following is a description of the halftone encoding. As previously noted, tile patterns are used to fill shaded areas of graphics and text objects in the final bitmap. Images are rendered using just the halftone without encoding. The encoding may be a predetermined pattern. For example the predetermined pattern may be a checkerboard pattern, which is an ON/OFF pattern in both directions, as illustrated in FIG. 2.

With respect to a checkerboard pattern, encoded bits are placed in even rows and even columns or odd rows and odd columns (the row and column numbering starts at 0 for the first row and column, and continues to width−1 and height−1).

The halftone pattern is rendered into each tile followed by the addition of checkerboard bits, where the checkerboard bits are only added in between halftone clusters, replacing the pixels, which are OFF.

Figure 3:
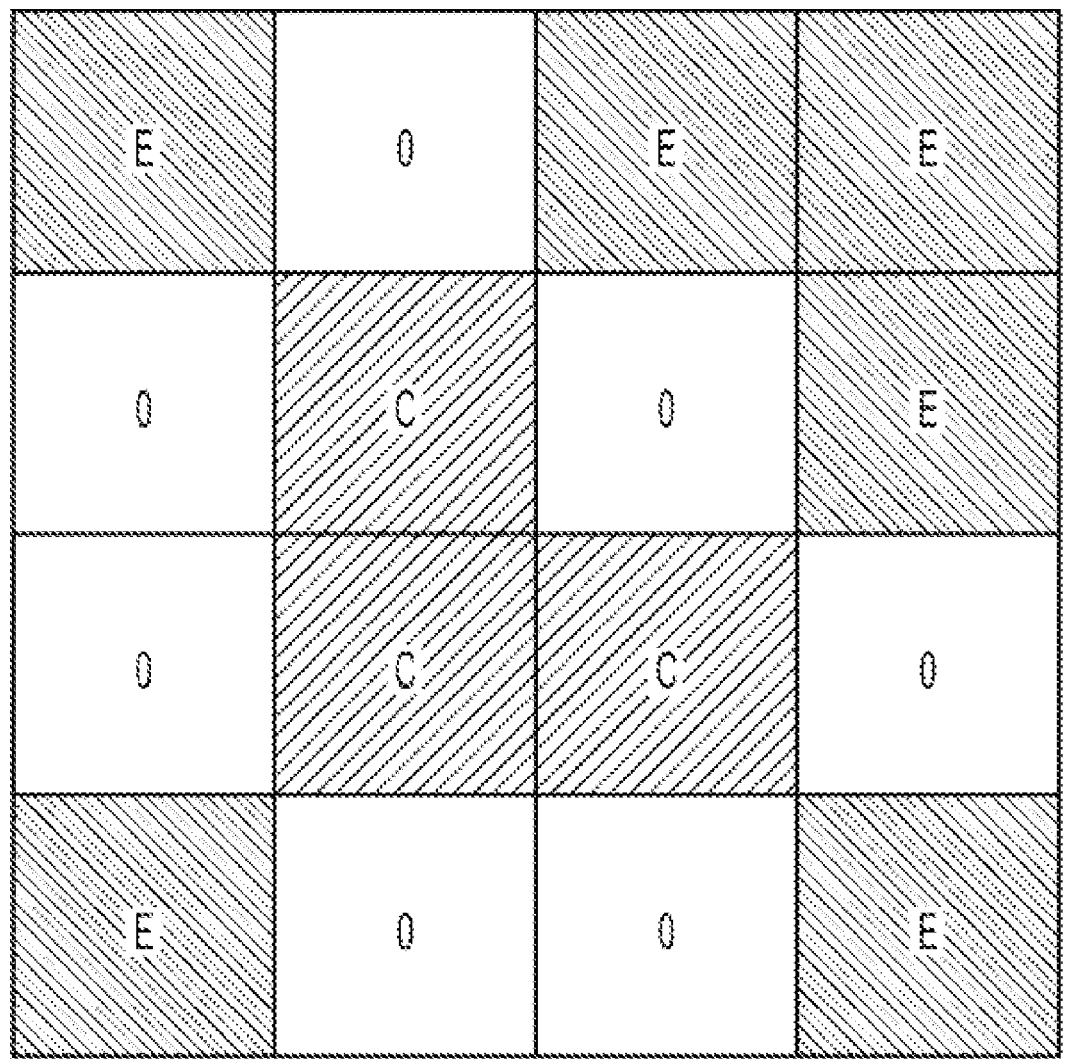
FIG. 3 shows an example of encoded pixels around a halftone cluster.

In this description, a halftone cluster is a cluster of adjacent pixels, which are ON. As illustrated in FIG. 3, a halftone cluster is represented by the shaded pixels labeled C. Furthermore, non-halftone cluster pixels are illustrated in FIG. 3 as pixels labeled 0 and pixels labeled E. In FIG. 3, the pixels labeled 0 represent OFF non-halftone cluster pixels, and the pixels labeled E represent encoded non-halftone cluster pixels.

It is noted as illustrated in FIG. 3, encoded bits (pixels labeled E) are only added where the halftone pattern is white or OFF (pixels labeled 0). This area is referred to as a non-halftone cluster area.

As further illustrated in FIG. 3, encoded bits are not added to pixels, which are adjacent, in either the horizontal or vertical direction, to the halftone cluster C.

In this encoding process, encoded bits may be added to pixels at the corners (diagonal direction) of the halftone clusters. However, if the halftone cluster is a single pixel halftone cluster, encoded bits are not be added to pixels at the corners (diagonal direction) of the single pixel halftone cluster because adding encoded bits to pixels at the corners (diagonal direction) of the single pixel halftone cluster makes the pattern indistinguishable.

Figure 4:
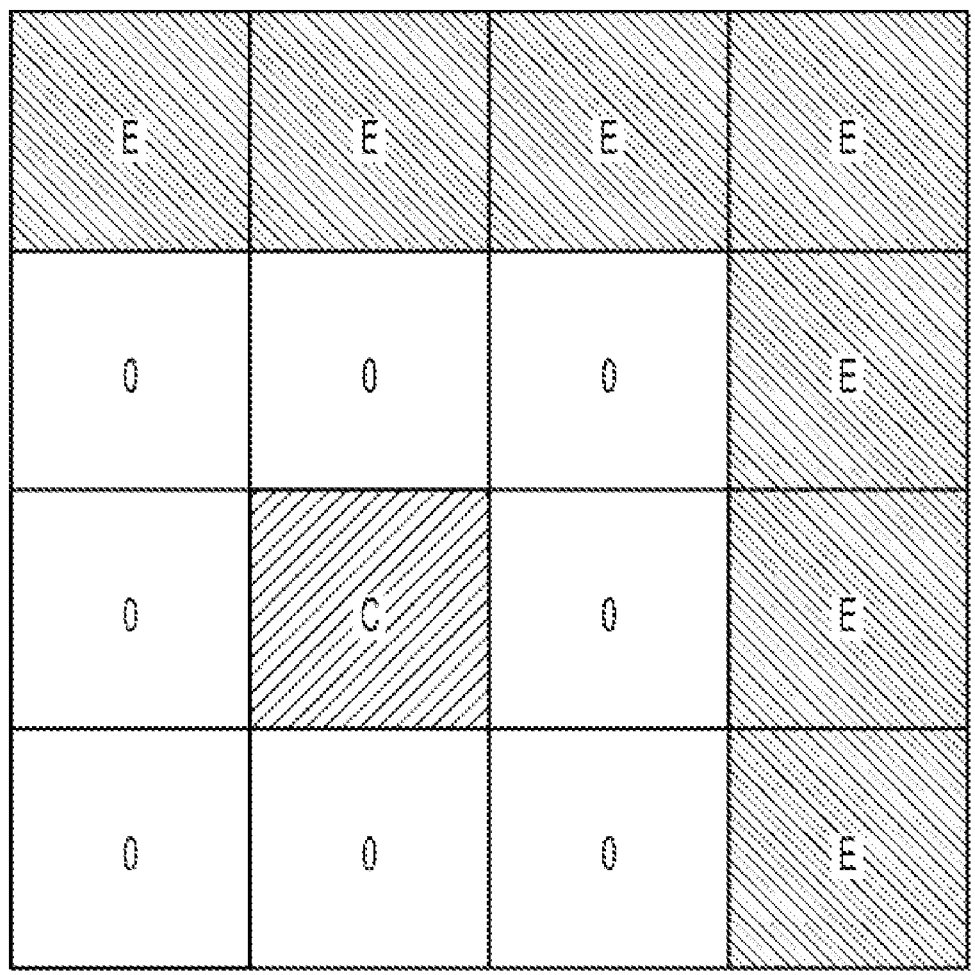
FIG. 4 shows an example of encoded pixels around a single pixel halftone cluster.

FIG. 4 illustrates a single pixel halftone cluster (C) wherein encoded bits are not added to pixels, which are adjacent, in either the horizontal or vertical direction, to the single pixel halftone cluster C, and encoded bits are not be added to pixels at the corners (diagonal direction) of the single pixel halftone cluster C.

Figure 5:
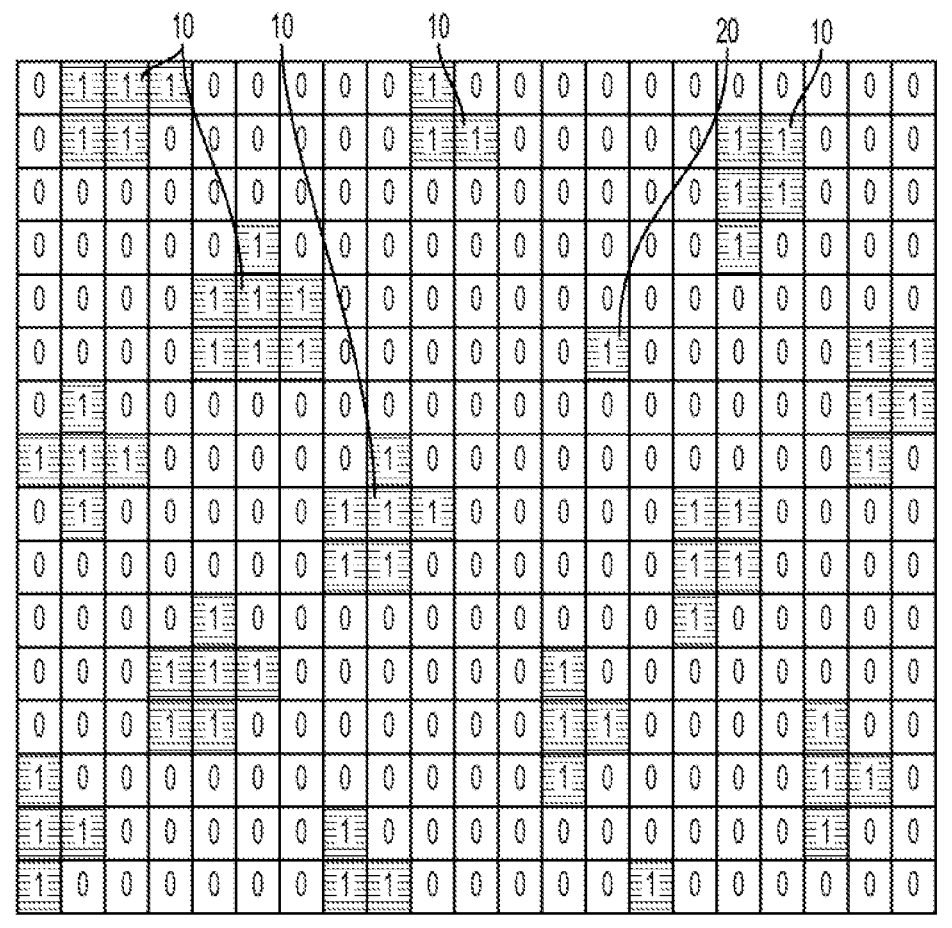

FIG. 5 illustrates an example of a tile having multiple halftone clusters of more than a single pixel (10) and single pixel halftone cluster 20.

Figure 6:
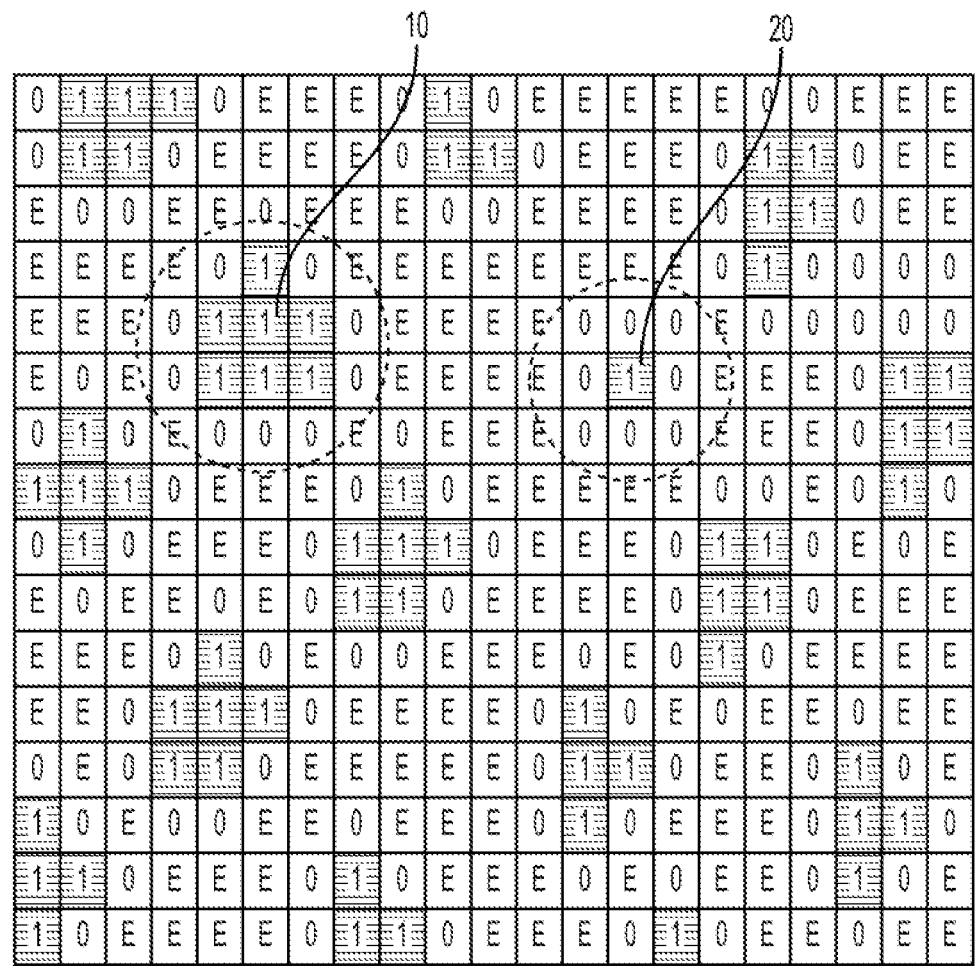
FIG. 6 shows an example of encoded pixels around the halftone clusters of FIG. 5.

FIG. 6 illustrates the encoding of the tile of FIG. 5 wherein the pixels of the non-halftone cluster areas are encoded (E) with a predetermined pattern.

However, as noted above, encoded bits are not added to pixels, which are adjacent, in either the horizontal or vertical direction, to the halftone cluster 10, as seen in the encircled area around halftone cluster 10. Moreover, encoded bits are not added to pixels, which are adjacent, in either the horizontal or vertical direction, to the single pixel halftone cluster 20, and encoded bits are not be added to pixels at the corners (diagonal direction) of the single pixel halftone cluster 20, as seen in the encircled area around halftone cluster 20.

Figure 7:
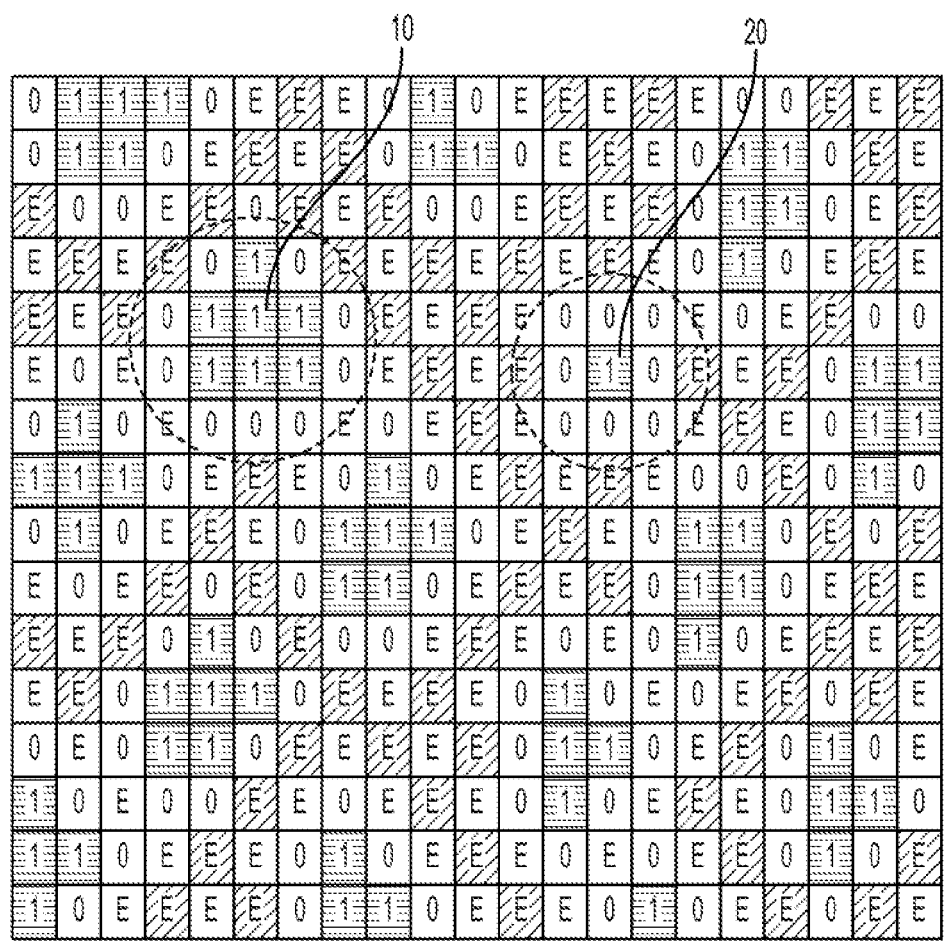
FIG. 7 shows an example of a rendered bitmap of the encoded pixels and the halftone clusters of FIG. 6 with a checkered board pattern.

FIG. 7 illustrates the encoding of the tile of FIG. 5 wherein the pixels of the non-halftone cluster areas are encoded (E) with a checkerboard pattern. In the encoded checkerboard pattern, grey-shaded pixels (E) represent pixels that are turned ON after encoding, and non-shaded pixels (E) represent pixels that are turned OFF after encoding.

However, as noted above, encoded bits are not added to pixels, which are adjacent, in either the horizontal or vertical direction, to the halftone cluster 10, as seen in the encircled area around halftone cluster 10. Moreover, encoded bits are not added to pixels, which are adjacent, in either the horizontal or vertical direction, to the single pixel halftone cluster 20, and encoded bits are not be added to pixels at the corners (diagonal direction) of the single pixel halftone cluster 20, as seen in the encircled area around halftone cluster 20.

Figure 8:
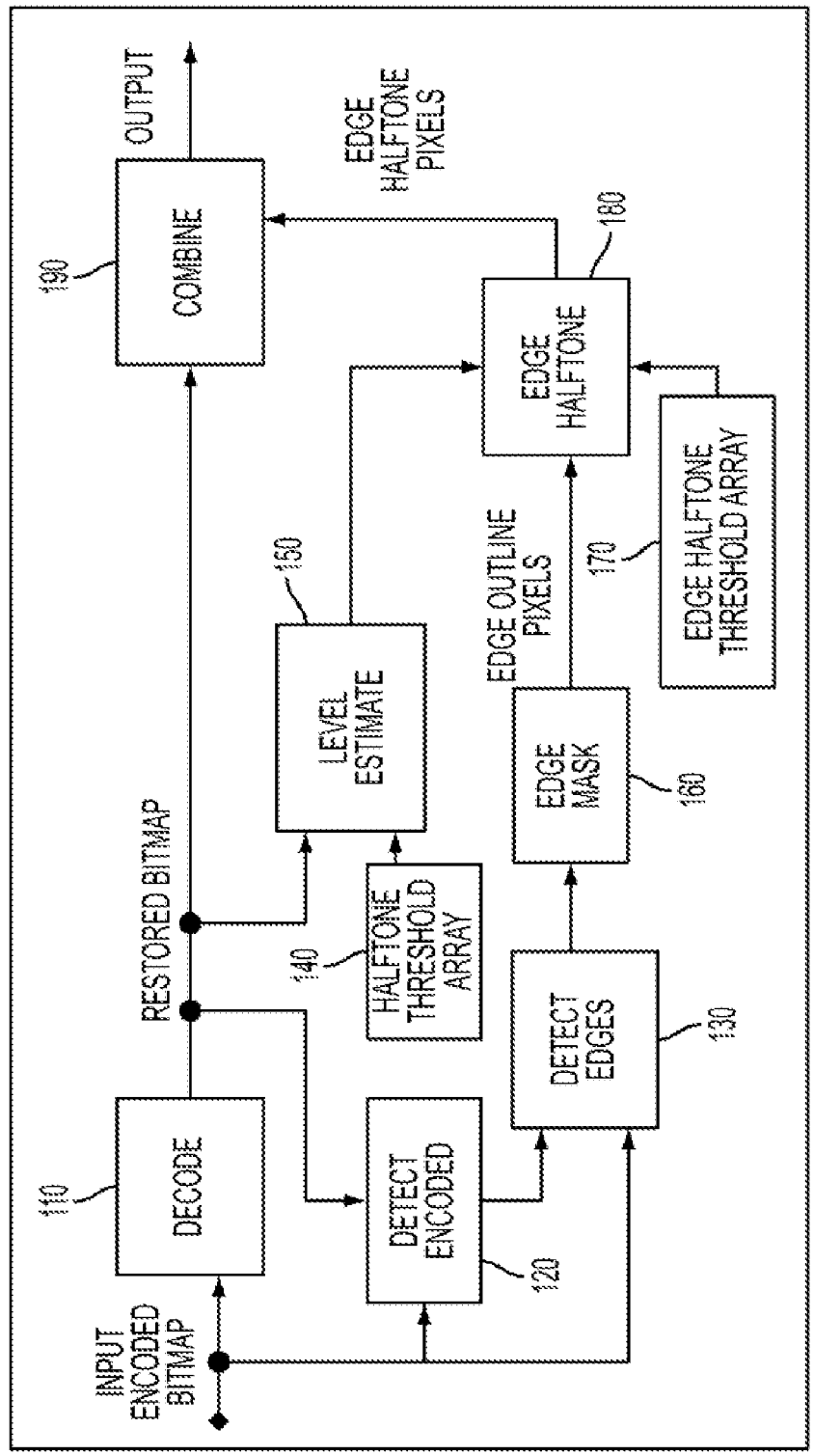
FIG. 8 illustrates a block diagram of an edge process.

As illustrated in FIG. 8, the bitmap is processed to remove the encoding and restore the original halftone patterns, and also add edge smoothing. A decoder 110 detects and removes the encoded checkerboard pixels that were added during halftone tile rendering. A detector of encoding 120 detects the encoded pixels and passes on the detected encoded pixels to detect the edges (mask smoothing). An edge detector 130 detects the edge by using the combined halftones and the encoding. The edge pixels may also be filtered to include only those surrounding encoded areas.

An edge mask circuit 160 smoothes, filters, and possibly thickens the eligible edge pixels to generate an edge outline mask (edge dilation). A level estimator 150 derives the original color level estimate from the neighborhood pattern and halftone threshold array values from halftone threshold array 140. An edge outline pattern is created, by edge halftone 180, using the estimated level compared to high frequency threshold array from high frequency halftone threshold array 170. The edge outline with a halftone pattern is combined, by combiner 190, with the restored bitmap, and sent to a printer.

As noted above, a decoder decodes the encoded bitmap to restored the bitmap to its original pattern. To decode the encoded bitmap, the encoded pixels are detected and the encoding removed.

The decoding process detects the encoded pixels. The actual decoding can be implemented with a look-up table, hardwired circuit, or from a set of rules used by a processor so that the encoded pixels in the bitmap are separated from those pixels intended for the original image. Since the encoding was performed only on the halftoned areas of the original image, the removal of the encoded pixels restores the original halftone pattern. The various rules to implement the decoding will be discussed below in more detail.

To better understand the decoding process, a checkerboard encoding pattern is assumed and FIG. 9 provides a graphic representation of a window of pixels used to detect the encoded pixels for decoding. The various rules, discussed below, determine if the shaded pixel C of FIG. 9 is an encoded pixel. As illustrated in FIG. 9, a window surrounding each pixel is used; for example a 5×5 neighborhood window surrounding the pixel in question can be used. Each pixel in the frame bitmap is examined as the window moves across the image. For example, the window may shift left to right along each raster (scanline). Moreover, the window may start at the top left corner of the frame wherein each raster is scanned from the top of the frame to the bottom of the frame.

Figures 10, 11:

Initially, the decoding process, as illustrated in FIG. 9, determines if the center pixel C is ON. If the center pixel C is ON, the decoding process, as illustrated in FIG. 10, determines if the pixels adjacent to the shaded center pixel (1) are OFF (0). The adjacent pixels would be pixels A1C, B1C, CL1, and CR1, as illustrated in FIG. 9. With respect to a checkerboard encoding pattern, if any of the adjacent pixels (A1C, B1C, CL1, or CR1 of FIG. 9) are ON (1), the center pixel is determined to be not encoded.

If the center pixel C is ON and the pixels adjacent to the center pixel are OFF (0), the decoding process, as illustrated in FIG. 11, determines that the center pixel is encoded if the corner pixels (shaded pixels) to the center pixel (1) are ON (1). More specifically, if a checkerboard pattern is used for encoding, the corner pixels would be pixels A1L1, A1R1, B1L1, and B1R1, as illustrated in FIG. 9.

In determining the status of the center pixel, a test is applied (illustrated in FIG. 11) wherein the center pixel is determined to be encoded if any three of the four corners are ON. More specifically, if any of three of the corner pixels (A1L1, A1R1, B1L1, or B1R1 of FIG. 9) are ON (1), the center pixel is determined to be encoded.

Center Pixel is encoded (assuming that the center pixel is ON and all the adjacent pixels are OFF) if:
A1L1, A1R1, and B1L1 are ON; or
A1R1, B1L1, and B1R1 are ON; or
A1L1, B1L1, and B1R1 are ON; or
A1L1, A1R1, and B1R1 are ON.

Figures 12, 13:
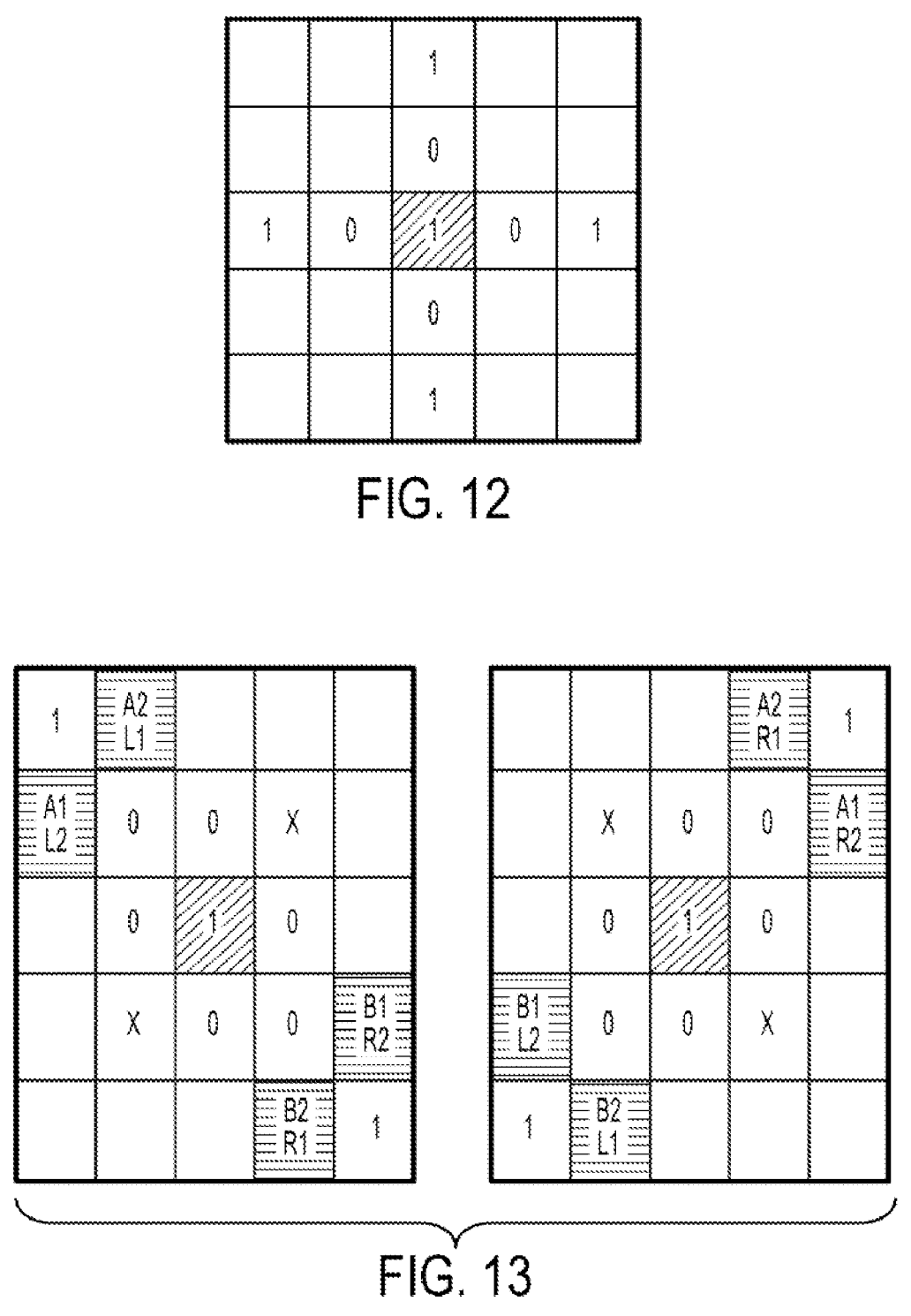

Also, if the center pixel C is ON and the pixels adjacent to the center pixel are OFF (0), the decoding process, as illustrated in FIG. 12, determines that the center pixel is encoded if any of the four pixels, which are two pixels from the shaded center pixel (1) in the horizontal or vertical direction, are ON.

More specifically, if a checkerboard pattern is used for encoding, the four pixels, which are two pixels from the shaded center pixel (1) in the horizontal or vertical direction, would be pixels A2C, B2C, L2C, and R2C, as illustrated in FIG. 9.

In determining the status of the center pixel, another test is applied (illustrated in FIG. 12) wherein the center pixel is determined to be encoded if any of the four pixels, which are two pixels from the center pixel in the horizontal or vertical direction, are ON. More specifically, if any of the four pixels, which are two pixels from the center pixel in the horizontal or vertical direction, (A2C, B2C, L2C, or R2C of FIG. 9) are ON (1), the center pixel is determined to be encoded.

Center Pixel is encoded (assuming that the center pixel is ON and all the adjacent pixels are OFF) if:
A2C is ON; or
B2C is ON; or
L2C is ON; or
L2C is ON.

If the center pixel C is ON and the pixels adjacent to the center pixel are OFF (0), the decoding process, as illustrated in FIG. 13, determines (assuming a checkerboard encoding pattern and a 5×5 window) that the center pixel is encoded if one or more pixels form a 45 degree line segment through the center pixel, and the pixels in the corners of the window are ON, and either of two pixels touching the corners of the window are ON, and the pixel in between these corners and the center is OFF.

More specifically, if a checkerboard pattern is used for encoding and a 5×5 window for decoding, the pixels in the corners of the window would be pixels A2L2, A2R2, B2L2, or B2R2, as illustrated in FIG. 9.

This test identifies the case where the encoding between halftone clusters is reduced to a single pixel, or row of pixels due to limited space. If clusters are not nearby, the center pixel is not considered to be encoded, and will not be modified.

In determining the status of the center pixel, another test is applied (illustrated in FIG. 13) wherein the center pixel is determined to be encoded if one or more pixels form a 45 degree line segment through the center pixel, and the pixels in the corners of the window are ON, and either of two pixels touching the corners of the window are ON, and the pixel in between these corners and the center is OFF.

Center Pixel is encoded (assuming that the center pixel is ON and all the adjacent pixels are OFF) if:
[A2L2 is ON and A1L1 is OFF] and [A1L2 is ON or A2L1 is ON]; or
[B2R2 is ON and B1R1 is OFF] and [B1R2 is ON or B2R1 is ON]; or
[A2R2 is ON and A1R1 is OFF] and [A1R2 is ON or A2R1 is ON]; or
[B2L2 is ON and B1L1 is OFF] and [B1L2 is ON or B2L1 is ON].

Figure 14:
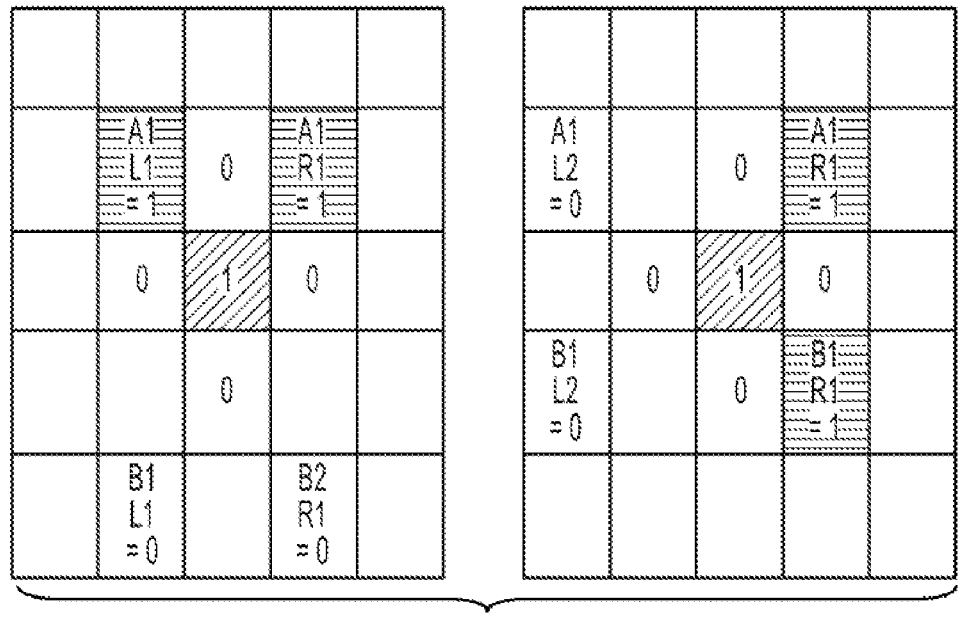
FIGS. 14 and 15 illustrate examples of a rule wherein if two pixels on any side touch the corners of the center pixel and all un-encoded pixel locations on the opposite side are OFF.
Figure 15:
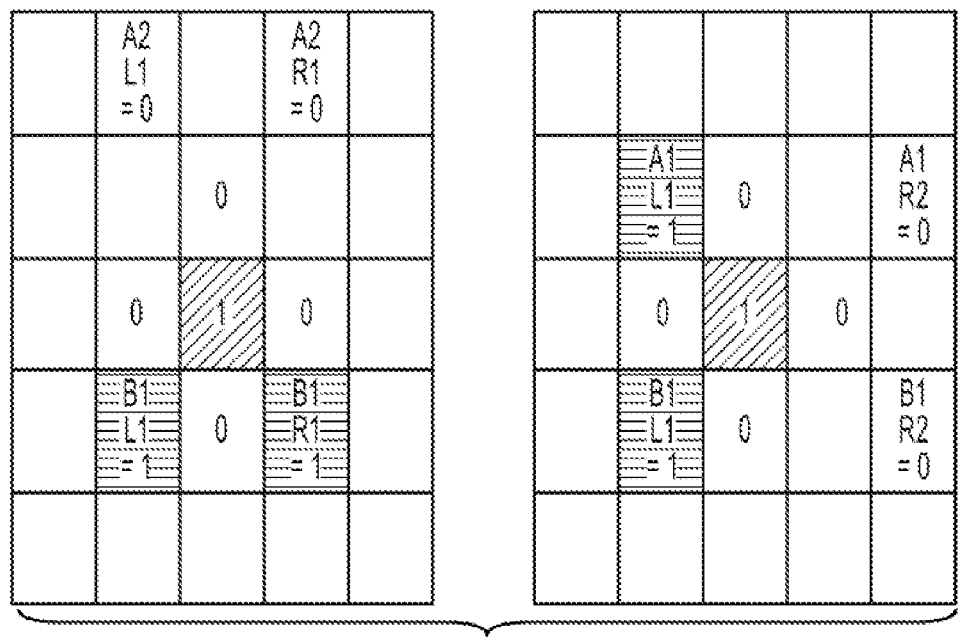

Furthermore, if the center pixel C is ON and the pixels adjacent to the center pixel are OFF (0), the decoding process, as illustrated in FIGS. 14 and 15, determines (assuming a checkerboard encoding pattern and a 5×5 window) that the center pixel is encoded if two pixels, on any side, touch the corners of the center pixel are ON and all un-encoded pixel locations on the opposite side are OFF.

More specifically, if a checkerboard pattern is used for encoding and a 5×5 window for decoding, the corner pixels would be pixels A1L1, A1R1, B1L1, and B1R1, as illustrated in FIG. 9. This test identifies the case where the encoding is cut off by the edge of an object such that one side is OFF. This condition would cover one possible case where one of the pixels is trimmed off because the pixel is outside the edge of the shaded object.

In determining the status of the center pixel, another test is applied (illustrated in FIGS. 14 and 15) wherein the center pixel is determined to be encoded if two pixels, on any side, touch the corners of the center pixel are ON and all un-encoded pixel locations on the opposite side are OFF.

Center Pixel is encoded (assuming that the center pixel is ON and all the adjacent pixels are OFF) if:
[A1L1 is ON and A1R1 is ON] and [B2L1 is OFF or B2R1 is OFF]; or
[A1R1 is ON and B1R1 is ON] and [A1L2 is OFF or B1L2 is OFF]; or
[B1L1 is ON and B1R1 is ON] and [A2L1 is OFF or A2R1 is OFF]; or
[B1L1 is ON and A1L1 is ON] and [A1R2 is OFF or B1R2 is OFF].

Using the above rules, the encoded pixels that are ON (1) are determined. A pixel by pixel comparison between the encoded input and the restored output after the decoding operation produces just the encoded bits. The encoded result is the logical AND of the input and the decoded output after inverting the pixel value. [Encoded=(Encoded Input) AND ~(Decoded Output)]

The above described encoding detection process can be modified to include a pixel OFF (zero) gap between the encoded pixels and the halftone clusters in generating the edge mask. An example of a pixel OFF (zero) gap 750 between the encoded pixels and the halftone clusters 100 is illustrated in FIG. 28.

The encoded pixels may produce edge outlines with many more gaps than desired. To reduce the undesired gaps, pixels can be added into the mask to fill-in many of the inherent (undesired) gaps. By adding pixels into the mask, the edge outline, found during edge detection, will span the entire gap between.

The mask is created by examining predetermined windows; for example, 5×3 windows, 3×5 windows, and a 7×5 window; from the detected encoded pixels.

Figure 25:
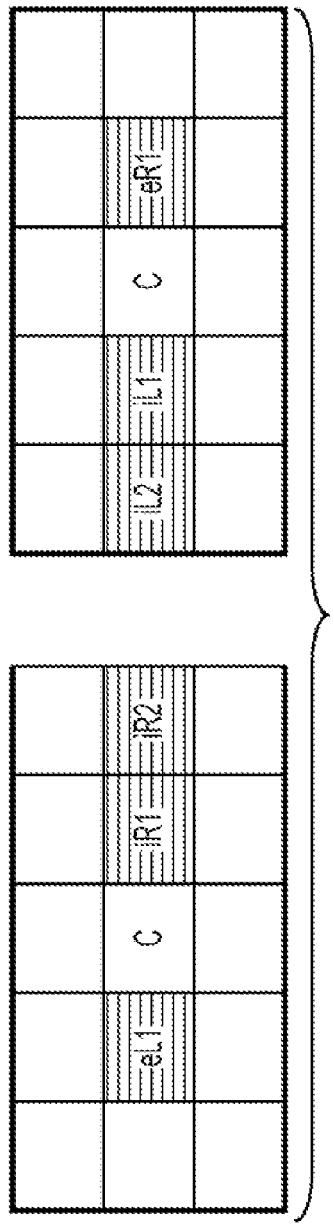
FIGS. 25-27 illustrate examples of the windows used to create an edge mask.
Figure 26:
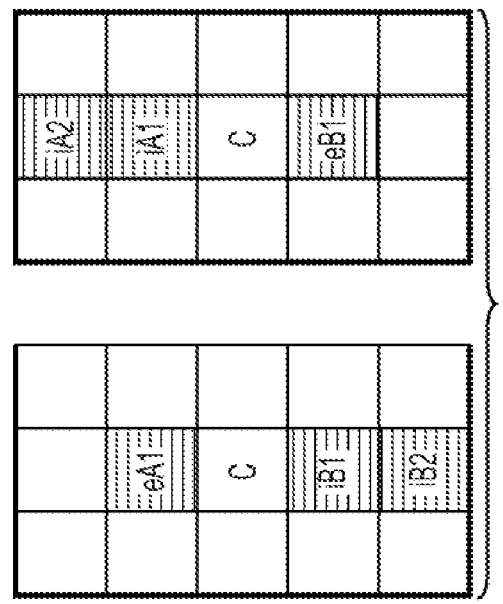
Figure 27:
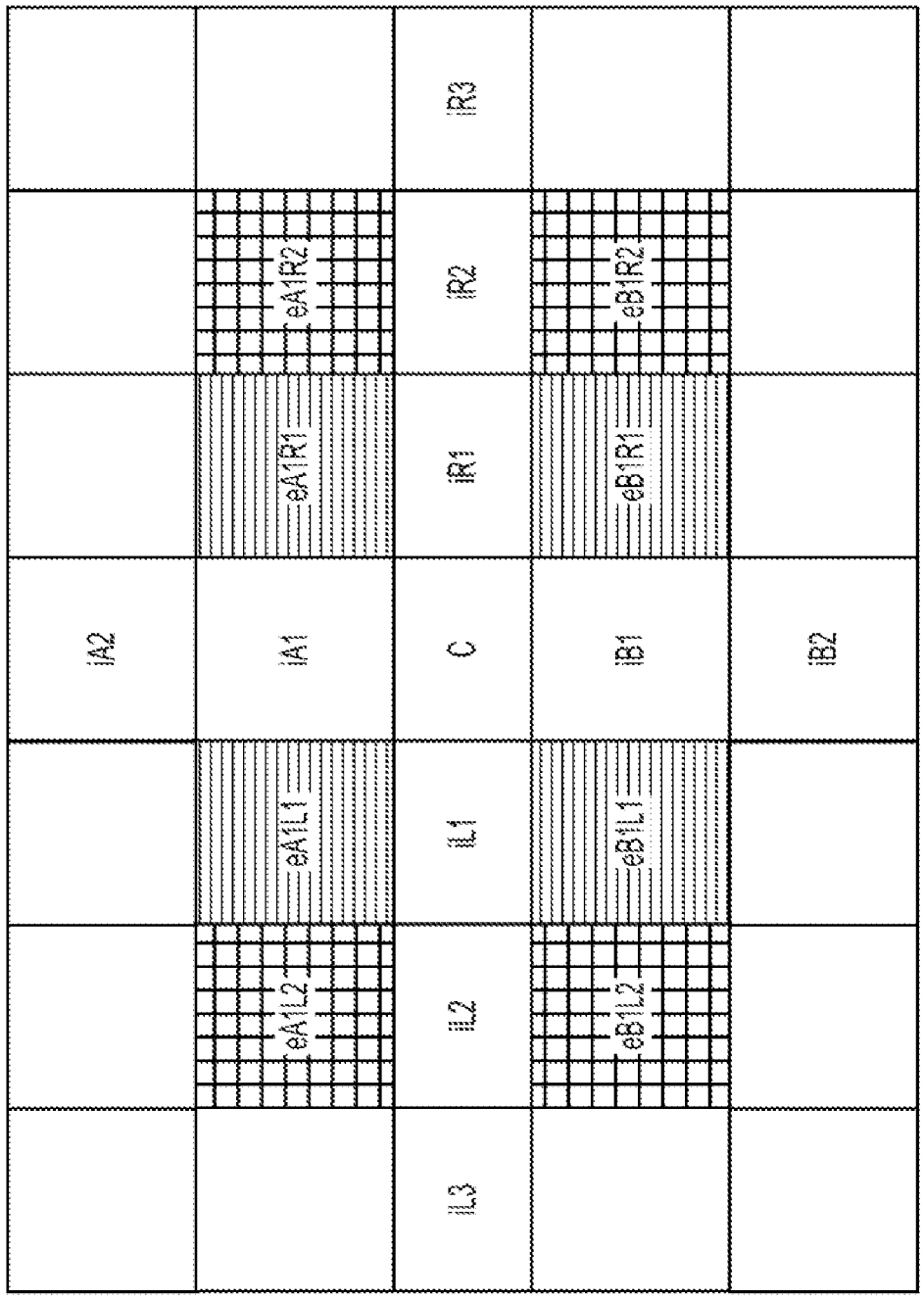

FIGS. 25-27 illustrate examples of the windows used to create an edge mask. As illustrated in FIGS. 25-27, the encoded pixels; labeled as eA1, eB1, eL1, eL2, eR1, eR2, eA1L2, eA1L1, eA1R1, eA1R2, eB1L2, eB1L1, eB1R1, and eB1R2; are derived from the input logically ANDed with the logical inverse of the decoded output. Moreover, the pixels; labeled as iA1, iA2, iB1, iB2, iL1, iL2, iL3, iR1, iR2, and i1R3; are from the input.

Using the modified process, as will be discussed in more detail below, a one-pixel (pixel OFF) gap can be included between encoded pixels and neighbor halftone clusters. If checkerboard encoding is used, two input pixels are included because the checkerboard encoding may add an additional pixel in the gap.

In this encoding detection process, the pixel C in FIGS. 25 and 26 is determined to be encoded if:
{(eL1 AND (iR1 OR iR2)) OR ((iL1 OR iL2) AND eR1) OR (eA1 AND (iB1 OR iB2)) OR (eB1 AND (iA1 OR iA2))}.

In the above rule, AND and OR are logical operations, and ~ is the negation (invert) logical operation. Moreover, eL1= (iL1 AND ~dL1), eR1=(iR1 AND ~dR1), eA1=(iA1 AND ~dA1), and eB1=(iB1 AND ~dB1). Prefix i indicates pixels from the input bitmap, and prefix d indicates pixels from the output of the decode logic.

Thereafter, the process detects zero (OFF) gaps between opposite corners of a predetermined input section; for example, a 5×3 input section, as illustrated in FIG. 27. The pixel C is added to the mask if input pixels exist in all of the four directions of the center column and center row of C. In other words, the pixel C is added to the mask if there are pixels in the column above and below, and in the row to the left and to the right. Thus, the pixel C is surrounded by other pixels. This enables the prevention of the spreading the mask outside the object borders.

With respect to this detecting of gaps between opposite corners of a predetermined input section, the pixel C in FIG. 27 is determined to be encoded if:
{(iL1 OR iL2 OR iL3) AND (iR1 OR iR2 OR iR3) AND (iA1 OR iA2) AND (iB1 OR iB2)} AND {eA1L1 OR eA1R1 OR eB1L1 OR eB1R1 OR eA1L2 OR eA1R2 OR eB1L2 OR eB1R2}.

In the above rule, AND and OR are logical operations.

Figure 16:
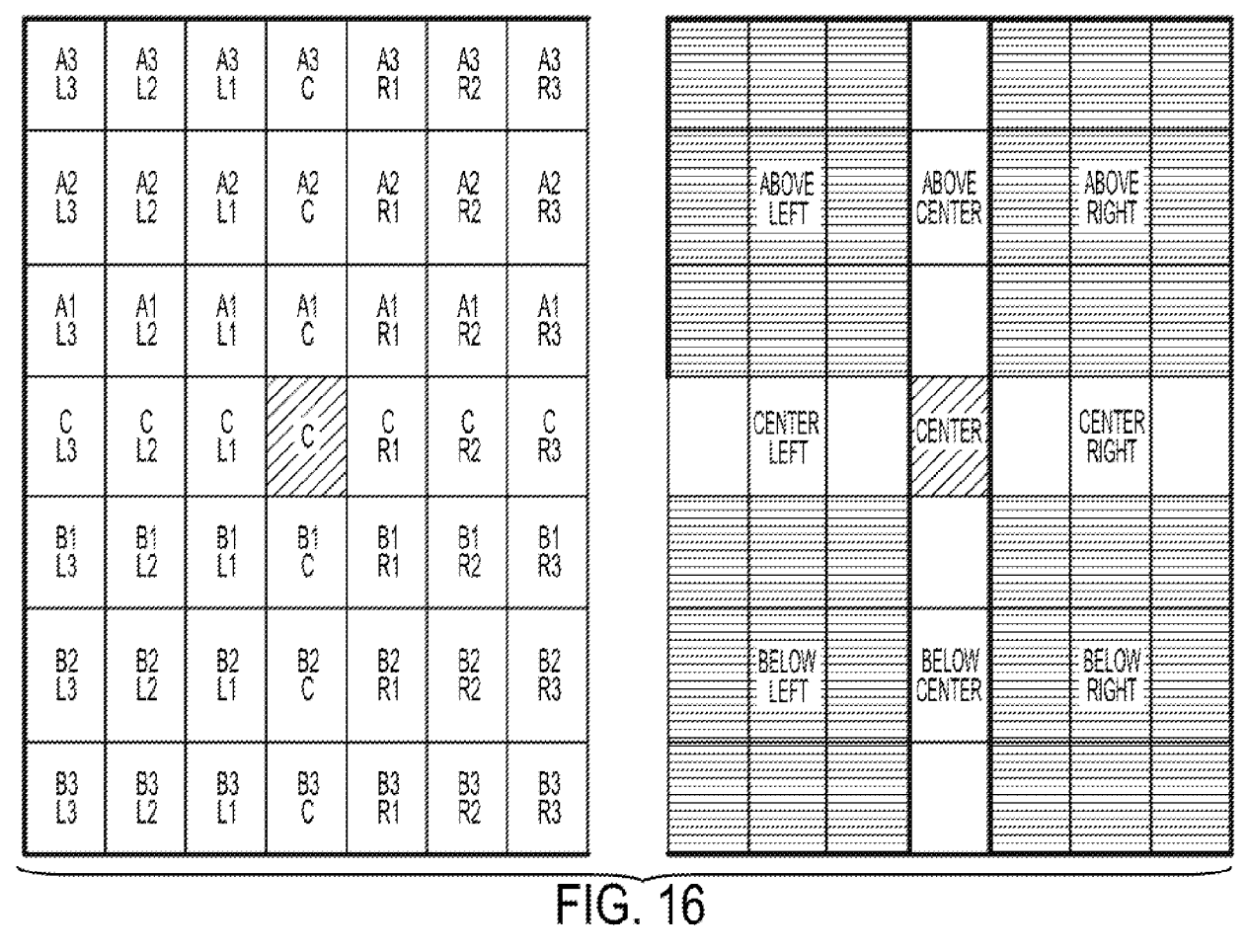

Edges are detected by producing an outline bit pattern of the encoded pixels. Possible object outline bit patterns are identified using a predetermined window (for example a 7×7 window as illustrated in FIG. 16) surrounding each center pixel as the edge detection process scans through the input bitmap along each raster. The required size of the window may be determined by the largest expected separation between pixels in the encoded halftone pattern. In a typical, un-encoded clustered halftone, the patterns for the lightest shades have pixels scattered on the page with a large separation. However, by using the halftone pattern as well as the checkerboard encoding, the edges can be found with a smaller window.

The edge detection process may identify the pixels from the input bitmap that are actually on the edge of text or graphics objects. For each detected pixel that is encoded, a surrounding window area is examined in the input bitmap. If pixel pattern is not uniform within the window such that any side or any corner is missing pixels, the particular encoded pixel is identified as an edge pixel. Otherwise, the particular encoded pixel is identified as a non-edge pixel.

The result is an outline with an irregular dashed appearance. This is due to the checkerboard encoding only qualifying alternate pixels, and also the outline is broken where the halftone cluster patterns were located.

It is noted that the encoding rule, which does not allow encoded pixels adjacent to halftone cluster causes the gaps.

The edges can be found by comparing the presence of ON pixels at each corner of each side and the corner pixels of the other side. The areas in each direction span three pixels from the center, as illustrated in FIG. 16.

The center pixel (C) is an edge if any of the following edge conditions are true:

C is a Right Edge if

{[[(Above Left)+(Center Left)>0] and [(Above Right)+(Center Right)==0]]; or
[[(Below Left)+(Center Left)>0] and [(Below Right)+(Center Right)==0]]}; and
[C is an encoded pixel].

C is a Left Edge if

{[[(Above Right)+(Center Right)>0] and [(Above Left)+(Center Left)==0]]; or
[[(Below Right)+(Center Right)>0] and [(Below Left)+(Center Left)==0]]}; and
[C is an encoded pixel].

C is a Top Edge if

{[[(Below Right)>0] and [(Above Right)==0]]; or
[[(Below Left)>0] and [(Above Left)==0]]}; and
[C is an encoded pixel].

C is a Bottom Edge if

{[[(Above Right)>0] and [(Below Right)==0]]; or
[[(Above Left)>0] and [(Below Left)==0]]}; and
[C is an encoded pixel].

If center pixel (C) is identified as a top or bottom edge pixel, the pixels to the left and/or right may also be identified as pixels for the edge outline mask so as to fill the inherent gaps in between the encoded pixels. Moreover, if center pixel (C) is a left or right edge pixel, the pixels above and/or below center pixel (C) are identified as edge pixels.

The candidates for neighbor edge pixels are in the areas of FIG. 16 (Center Left), (Center Right), (Above Center), and (Below Center).

(Center Left) are Edge Pixels if

{[[(Below Left)>0] and [(Above Left)==0]]; or
[(Above Left)>0] and [(Below Left)==0]]}; and
[C is an edge pixel].

(Center Right) are Edge Pixels if

{[[(Below Right)>0] and [(Above Right)==0]]; or
[[(Above Right)>0] and [(Below Right)==0]]}; and
[C is an edge pixel].

(Above Center) are Edge Pixels if

{[[(Above Left)>0] and [(Above Right)==0]]; or
[[(Above Right)>0] and [(Above Left)==0]]}; and
[C is an edge pixel].

(Below Center) are Edge Pixels if

{[[(Below Left)>0] and [(Below Right)==0]]; or
[[(Below Right)>0] and [(Below Left)==0]]}; and
[C is an edge pixel].

It is noted that the outline may have some gaps because edges can occur in the void areas adjacent to halftone clusters. Thus, additional filling of gaps may be required to keep the edge results smooth when printed. The actual filling may depend upon the halftone used, and characteristics of the printing.

Another adjustment may be to thicken the edge outline results (edge dilation). In this case, the adjacent neighbors in the center row and center column are duplicated from the outlines found for the center row and column pixels.

For example, an edge pixel identified above as a left edge above the center would thicken the edge outline by duplicating the pixels to the right of the upper center column (in FIG. 16, to the right of the (Above Center) area). Moreover, if an edge pixel is a top pixel, the pixels below the (Center left) and (Center Right) areas in FIG. 16 would be copied from the center row.

The results of the duplication (dilated results) can be logically ANDed with the results of the encoding detection to realize a thickened outline that covers only the mask from the output of encoding detection (mask smoothing).

One example of edge dilation is that the output of the edge dilation process indicates an ON pixel if any edge pixel in a predetermined window; for example a 5×5 window; is ON and the output from the encoding detection indicates encoding (1).

It is noted that the window of pixels used for the encoding detection can cover the same window of pixels being output from the edge detection process. Furthermore, it is noted that the number of rows and columns for dilation can be changed to adjust the thickness of the edge smoothing.

Also, it is noted that allowing a dilated edge mask to touch halftone clusters makes the halftone clusters too dark, thus it may be desirable to separate the edge mask one or more pixels from existing halftone clusters. It is noted that this separation can be realized by the edge halftone process.

However, another process can realize the separation. In this process, if any pixel in a predetermined (window) neighborhood of the decode output; for example a 3×3 window; (the restored bitmap) is ON, the output of edge dilation is set to zero (OFF).

It is noted that if more than one pixel separation is required, the separation may not necessarily be achieved at all levels. If two or more pixel separation is level dependent, the separation can be done in the edge halftone process.

To estimate the level, the surrounding pixels are counted, as disclosed in co-pending U.S. patent application Ser. No. 11/694,378, filed on Mar. 30, 2007, entitled "Method and System for Selective Bitmap Edge Smoothing." The entire content of co-pending U.S. patent application Ser. No. 11/694,378, filed on Mar. 30, 2007, is hereby incorporated by reference.

Another process to estimate the level is to examine the halftone threshold values of corresponding pixels that are ON in the area surrounding the edge pixels. The actual size and shape of the area is not critical as long as actual size and shape of the area covers at least one halftone cell area on any side of the edge. If actual size and shape of the area is too large, the estimate may include pixels that are not part of the halftone pattern being examined, and could have produce errors.

An example of an area to be examined may be symmetrically shaped with a small minimum radius from the center.

The estimated level is the maximum of the threshold array values found corresponding to the pixels that are ON.

It is noted that in a color system, the estimated level can be reduced to take into account color ratios (mixtures) and adjacent color pixels from one or more of the color channels because when more than one color channel is printing in the same area, the level estimate may be available from the other colors.

For example, a magenta edge next to a black edge may be too dark. To compensate for this undesired darkness, the level estimate can be reduced for each channel so that the sum of the estimate levels of all channels is below an adjustable maximum value.

Adjusting the level estimate of a channel can be realized by, for example, finding the sum of the levels of the other channels, not including the current channel. The level from each channel can then be weighted to adjust the value.

For example, if it desired to reduce cyan (C), magenta (M), and yellow (Y) edges next to black (K) edges, the weighted values for cyan, magenta, and yellow can be set lower than the black weighted value. On the other hand, if it is desired to only allow edges of a channel mixed with yellow and reduce the levels of any other color mixed with black, the weighting value for yellow can be set to zero and the weighting values for the other colors set to a value greater than zero.

The following are the weighted sums for a current channel (wherein M is the magenta value, C is the cyan value, Y is the yellow value, K is the black value, $M_{adj}$ is the weight value for magenta, $C_{adj}$ is the weight value for cyan, $Y_{adj}$ is the weight value for yellow, and $K_{adj}$ is the weight value for black):

If the current channel is C: Sum=$M*M_{adj}+Y*Y_{adj}+K*K_{adj}$
If the current channel is M: Sum=$C*C_{adj}+Y*Y_{adj}+K*K_{adj}$
If the current channel is Y: Sum=$C*C_{adj}+M*M_{adj}+K*K_{adj}$
If the current channel is K: Sum=$C*C_{adj}+M*M_{adj}+Y*Y_{adj}$ Using the above weighted sums, the estimate level can be reduced. For example, the level can be determined to be the maximum value between the value zero and the difference between the current channel level and the weighted sum value for the current channel. [Level output=max(0, (Current channel level)−(Other channel Sum))]

The number of pixels added or changed along an eligible edge outline controls the edge darkness. If the shade of the object is light, the added pixels should be minimum, and if the shade is dark, more pixels may be added to fill in between the jagged halftone structure. One method to control the darkness of edge pixels is to re-halftone the edges using the level and the edge outline found from the detection and filtering as a mask.

Another method adds pixels in between clusters, and the number of pixels added or replaced is controlled by the level found. The re-halftone implementation provides more flexibility to control the pixels because the edge pixel patterns can be easily synchronized with the original halftone patterns. Tone curves are also applied to tune for the best edge darkness at each level. The halftone is applied to the edges by comparing the level estimate with values in a threshold array.

The logic for each pixel that is ON in the edge outline mask from filtering can be expressed as: if (Level>threshold value), {edge pixel=ON} else {edge pixel=OFF}.

Once the edge outline is halftoned to make an actual edge pixel pattern, the result is combined with the output bitmap, ready to print. The logic for combined output can be expressed as: if (edge outline pixel is ON), {output pixel=edge pixel}.

As noted above, the encoding/decoding process discussed does not alter the existing halftone clusters in any way. Thus, the decoding does not alter the shape of the halftone clusters or add pixels along the sides or edges.

The preservation of halftone cluster shapes allows any color level to be chosen to transition into encoding without the decoding algorithm causing a print artifact.

In summary, an image processing system includes an image type classification circuit to identify inputted image data as picture image data or text/graphics image data; a halftone circuit, operatively connected to the image type classification circuit, to convert the inputted image data, identified as picture image data, to halftone image data; a tile pattern circuit, operatively connected to the image type classification circuit, to replace the inputted image data, identified as text/graphics image data, with tile patterns; an encoding circuit, operatively connected to the tile pattern circuit, to encode non-halftone cluster areas in the tile patterns with a predetermined pattern; a bitmap rendering circuit, operatively connected to the encoding circuit and the halftone circuit, to combine the halftone image data from the halftone circuit with the encoded tile patterns from the encoder circuit to render a bitmap; and a buffer to store the bitmap.

It is noted that the predetermined pattern may be a checkerboard pattern or a high frequency checkerboard pattern. Moreover, it is noted that the encoding circuit may include an OR circuit, the OR circuit ORing the non-halftone cluster areas in the tile patterns with the predetermined pattern.

It is further noted that the encoding circuit encodes only non-adjacent pixels of the non-halftone cluster areas in the tile patterns with a predetermined pattern, an adjacent pixel being a pixel immediately adjacent to a pixel of a halftone cluster. Also, it is noted that the encoding circuit encodes only non-adjacent pixels of the non-halftone cluster areas in the tile patterns with a predetermined pattern, an adjacent pixel being a pixel immediately adjacent, in a horizontal direction, to a pixel of a halftone cluster.

Furthermore, it is noted that the encoding circuit encodes only non-adjacent pixels of the non-halftone cluster areas in the tile patterns with a predetermined pattern, an adjacent pixel being a pixel immediately adjacent, in a vertical direction, to a pixel of a halftone cluster.

It is noted that the encoding circuit encodes only non-adjacent pixels of the non-halftone cluster areas in the tile patterns with a predetermined pattern, an adjacent pixel being a pixel immediately adjacent, in a horizontal, vertical, or diagonal direction, to a single pixel halftone cluster.

It is noted that the encoding circuit encodes only non-adjacent pixels of the non-halftone cluster areas in the tile patterns with a predetermined pattern, an adjacent pixel being a pixel immediately adjacent, in a horizontal or vertical direction, to a pixel of a halftone cluster, said adjacent pixel being a pixel immediately adjacent, in a horizontal, vertical, or diagonal direction, to a single pixel halftone cluster.

It is noted that the encoding circuit encodes only non-adjacent pixels of the non-halftone cluster areas in the tile patterns with the high frequency checkerboard pattern, an adjacent pixel being a pixel immediately adjacent, in a horizontal or vertical direction, to a pixel of a halftone cluster, said adjacent pixel being a pixel immediately adjacent, in a horizontal, vertical, or diagonal direction, to a single pixel halftone cluster.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image processing system, comprising:
    an image type classification circuit to identify inputted image data as picture image data or text/graphics image data;
    a halftone circuit, operatively connected to said image type classification circuit, to convert the inputted image data, identified as picture image data, to halftone image data;
    a tile pattern circuit, operatively connected to said image type classification circuit, to replace the inputted image data, identified as text/graphics image data, with tile patterns;
    an encoding circuit, operatively connected to said tile pattern circuit, to encode non-halftone cluster areas in the tile patterns with a predetermined pattern;
    a bitmap rendering circuit, operatively connected to said encoding circuit and said halftone circuit, to combine the halftone image data from said halftone circuit with the encoded tile patterns from said encoder circuit to render a bitmap; and
    a buffer to store said bitmap;
    said encoding circuit encoding only non-adjacent pixels of the non-halftone cluster areas in the tile patterns with a predetermined pattern, an adjacent pixel being a pixel immediately adjacent to a pixel of a halftone cluster.

2. The image processing system as claimed in claim 1, wherein the predetermined pattern is a checkerboard pattern.

3. The image processing system as claimed in claim 1, wherein the predetermined pattern is a high frequency checkerboard pattern.

4. The image processing system as claimed in claim 3, wherein said adjacent pixel is a pixel immediately adjacent, in horizontal or vertical direction, to a pixel of a halftone cluster, and said adjacent pixel is a pixel immediately adjacent, in a horizontal, vertical, or diagonal direction, to a single pixel halftone cluster.

5. The image processing system as claimed in claim 1, wherein said encoding circuit includes an OR circuit, said OR circuit logically ORing the non-halftone cluster areas in the tile patterns with the predetermined pattern.

6. The image processing system as claimed in claim 1, wherein said adjacent pixel is a pixel immediately adjacent, in a horizontal direction, to a pixel of a halftone cluster.

7. The image processing system as claimed in claim 1, wherein said an adjacent pixel is a pixel immediately adjacent, in a vertical direction, to a pixel of a halftone cluster.

8. The image processing system as claimed in claim 1, wherein said adjacent pixel is a pixel immediately adjacent, in a horizontal, vertical, or diagonal direction, to a single pixel halftone cluster.

9. The image processing system as claimed in claim 1, wherein said adjacent pixel is a pixel immediately adjacent, in horizontal or vertical direction, to a pixel of a halftone cluster, and said adjacent pixel is a pixel immediately adjacent, in a horizontal, vertical, or diagonal direction, to a single pixel halftone cluster.

10. A method for image processing, comprising:
    (a) identifying inputted image data as picture image data or text/graphics image data;
    (b) converting the inputted image data, identified as picture image data, to halftone image data;
    (c) replacing the inputted image data, identified as text/graphics image data, with tile patterns;
    (d) encoding non-halftone cluster areas in the tile patterns with a predetermined pattern by only encoding non-adjacent pixels of the non-halftone cluster areas in the tile patterns with a predetermined pattern, an adjacent pixel being a pixel immediately adjacent to a pixel of a halftone cluster;
    (e) combining the halftone image data with the encoded tile patterns to render a bitmap; and
    (f) storing the bitmap.

11. The method as claimed in claim 10, wherein the predetermined pattern is a checkerboard pattern.

12. The method as claimed in claim 10, wherein the predetermined pattern is a high frequency checkerboard pattern.

13. The method as claimed in claim 12, wherein the adjacent pixel is a pixel immediately adjacent, in a horizontal or vertical direction, to a pixel of a halftone cluster, and the adjacent pixel is a pixel immediately adjacent, in a horizontal, vertical, or diagonal direction, to a single pixel halftone cluster.

14. The method as claimed in claim 10, wherein the encoding includes logically ORing the non-halftone cluster areas in the tile patterns with the predetermined pattern.

15. The method as claimed in claim 10, wherein the adjacent pixel is a pixel immediately adjacent, in a horizontal direction, to a pixel of a halftone cluster.

16. The method as claimed in claim 10, wherein the adjacent pixel is a pixel immediately adjacent, in a vertical direction, to a pixel of a halftone cluster.

17. The method as claimed in claim 10, wherein the adjacent pixel is a pixel immediately adjacent, in a horizontal, vertical, or diagonal direction, to a single pixel halftone cluster.

18. The method as claimed in claim 10, wherein the adjacent pixel is a pixel immediately adjacent, in a horizontal or vertical direction, to a pixel of a halftone cluster, and the adjacent pixel is a pixel immediately adjacent, in a horizontal, vertical, or diagonal direction, to a single pixel halftone cluster.

* * * * *